Sept. 14, 1965  T. E. ROBERTS, JR., ET AL  3,206,022
COLOR SORTING APPARATUS
Filed Oct. 10, 1961  14 Sheets-Sheet 11
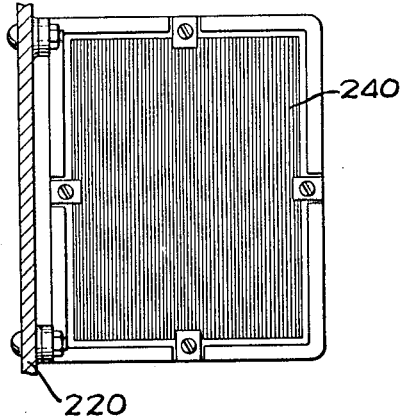
FIG_13
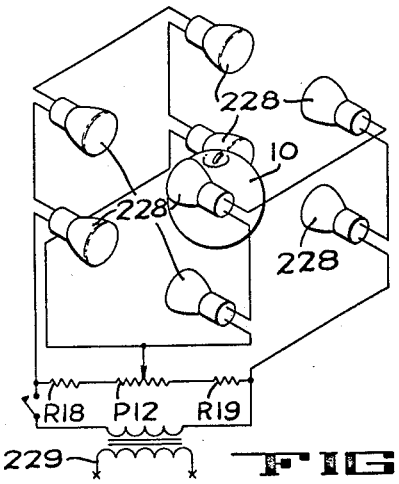
FIG_14
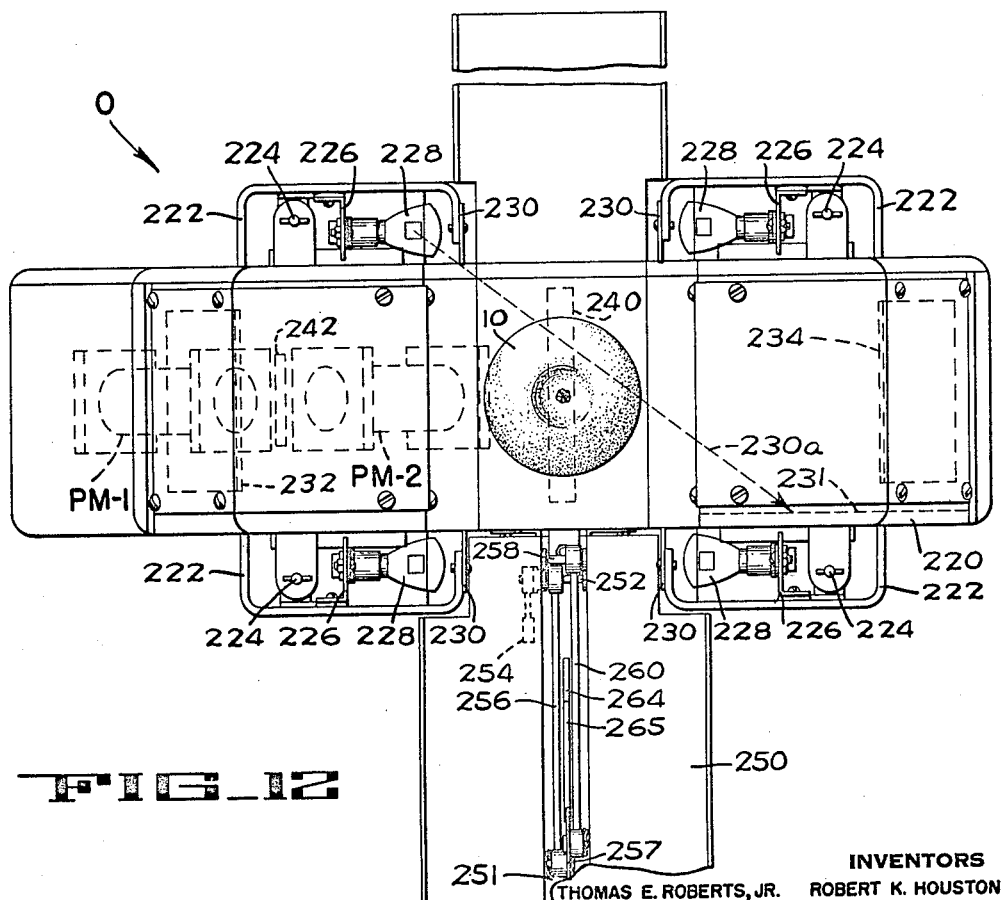
FIG_12
INVENTORS
THOMAS E. ROBERTS, JR.   ROBERT K. HOUSTON
VERNON O. BLACKLEDGE   RONALD J. BILLETT
BY Hans G. Hoffmeister
ATTORNEY

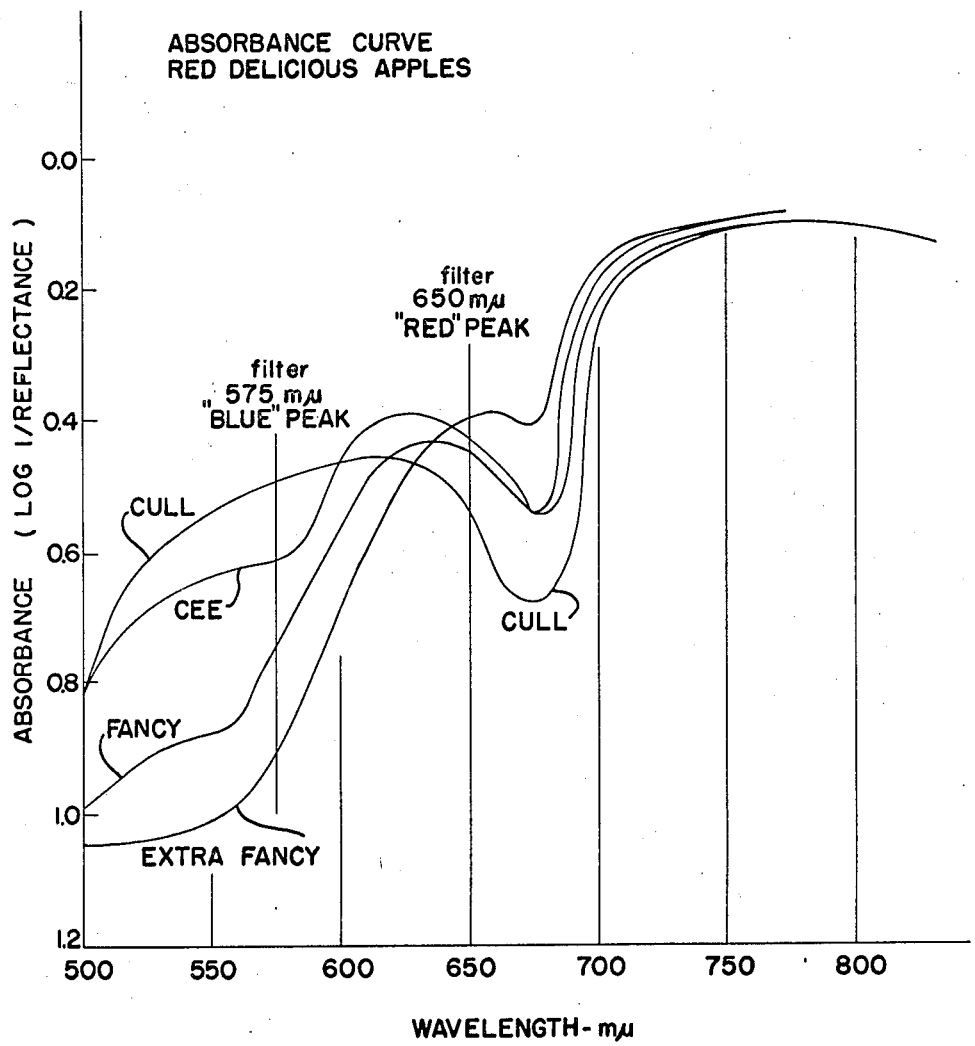

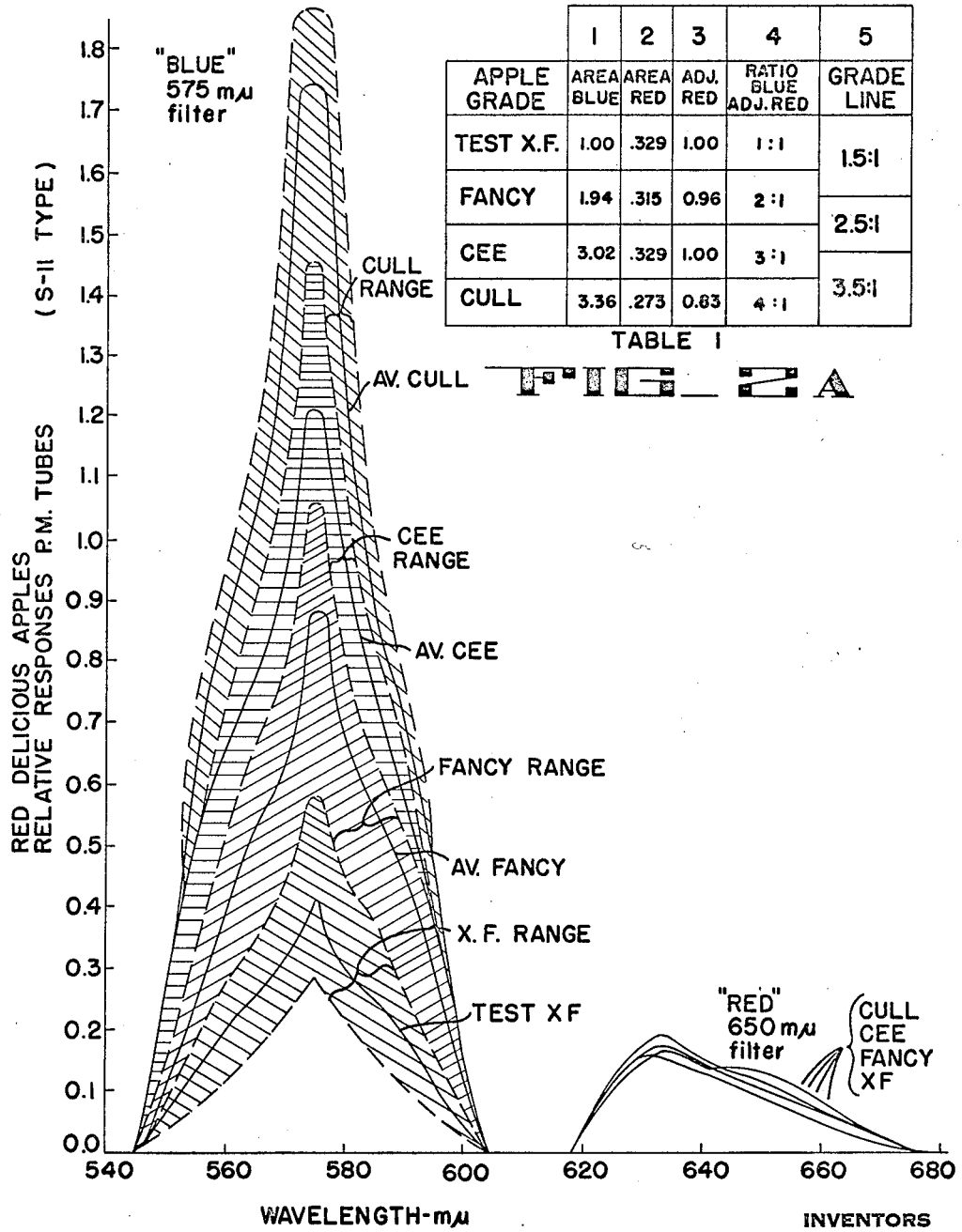

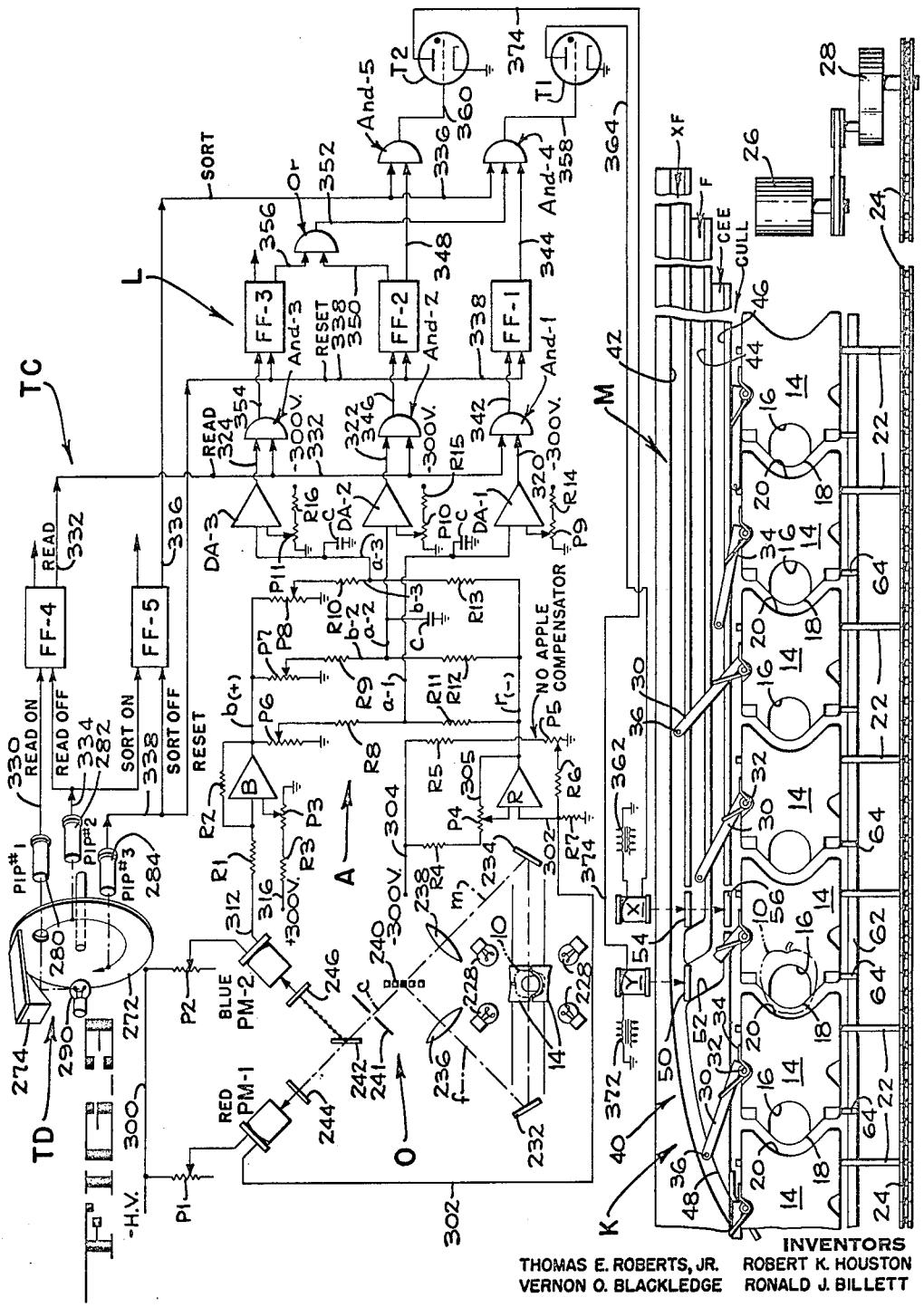

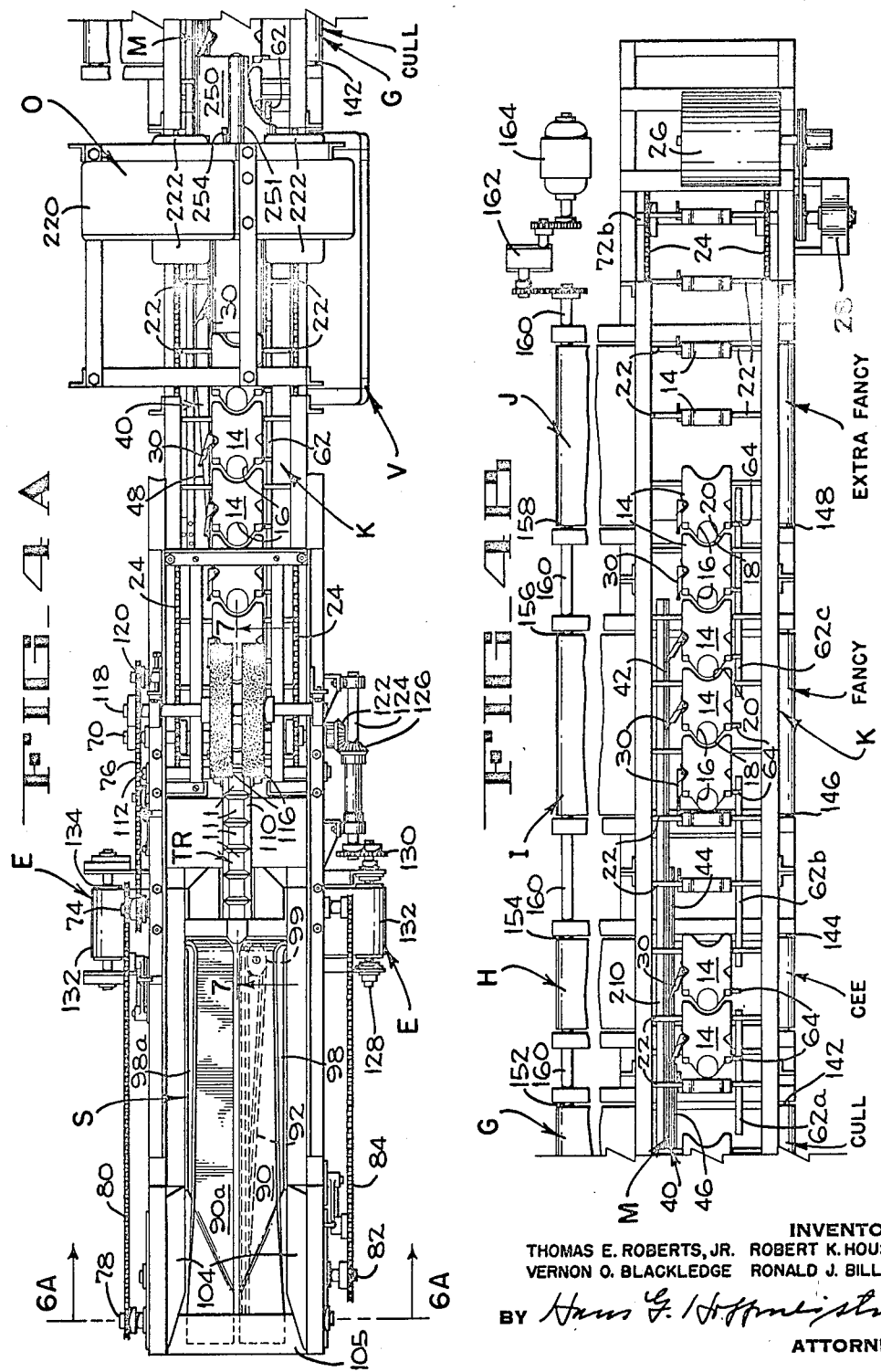

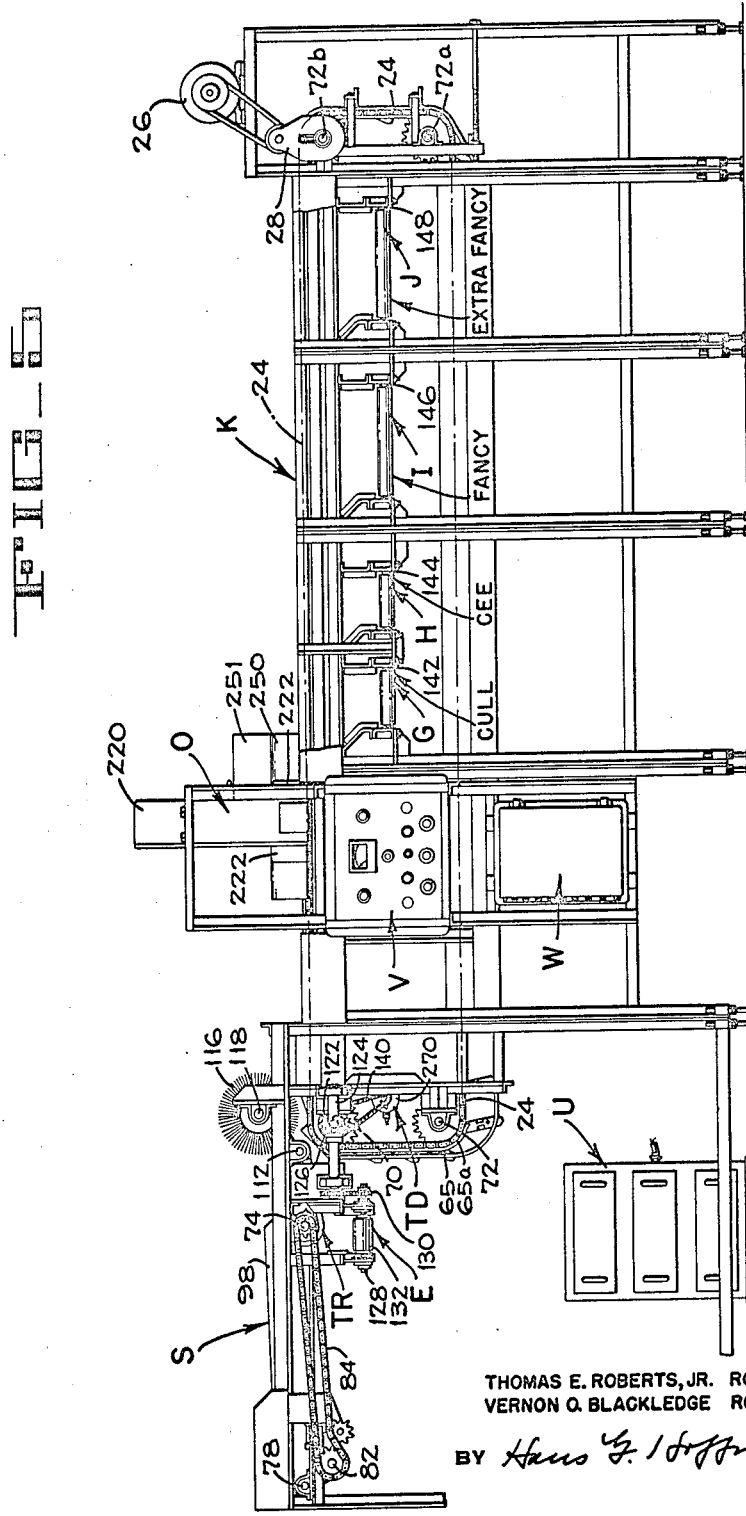

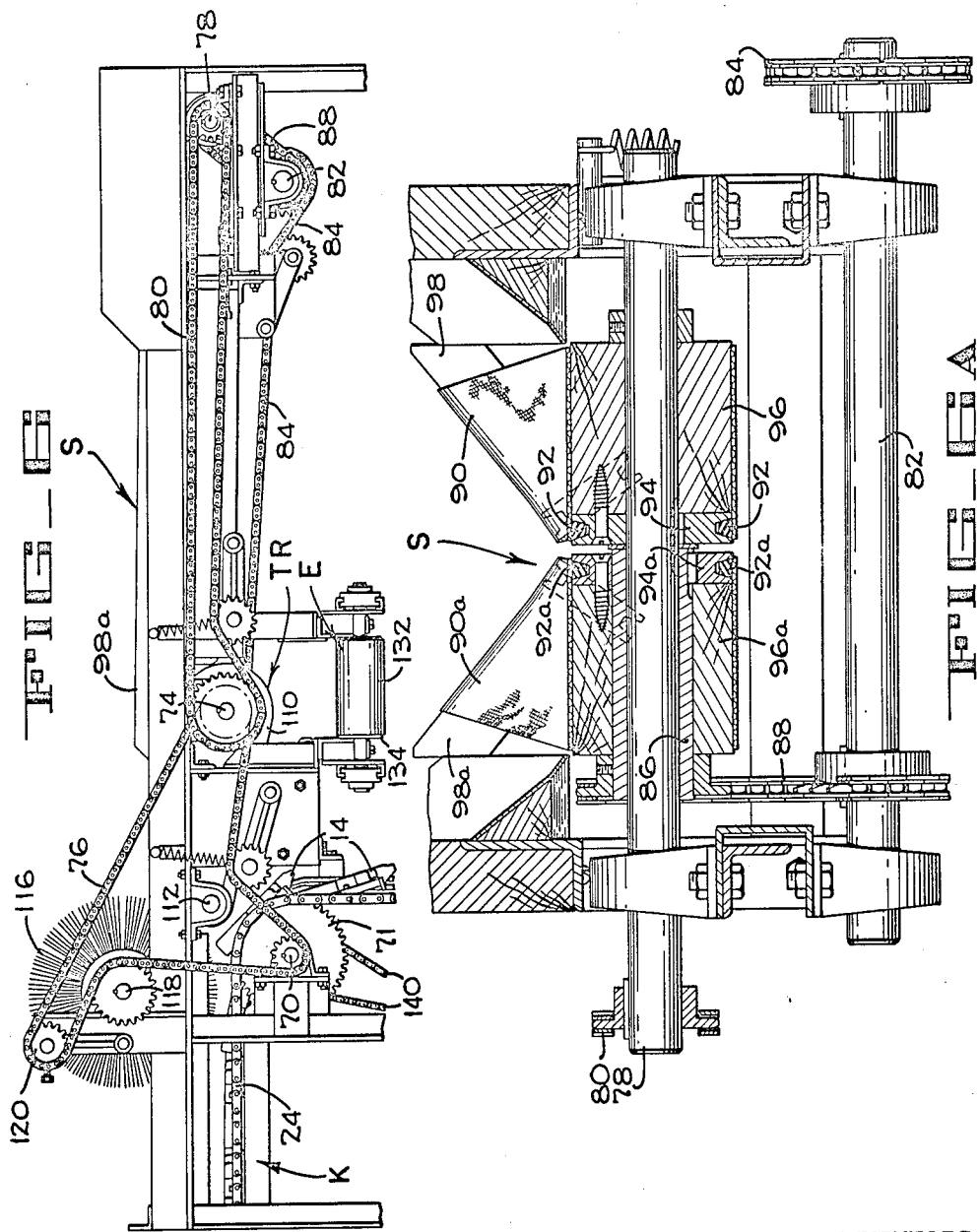

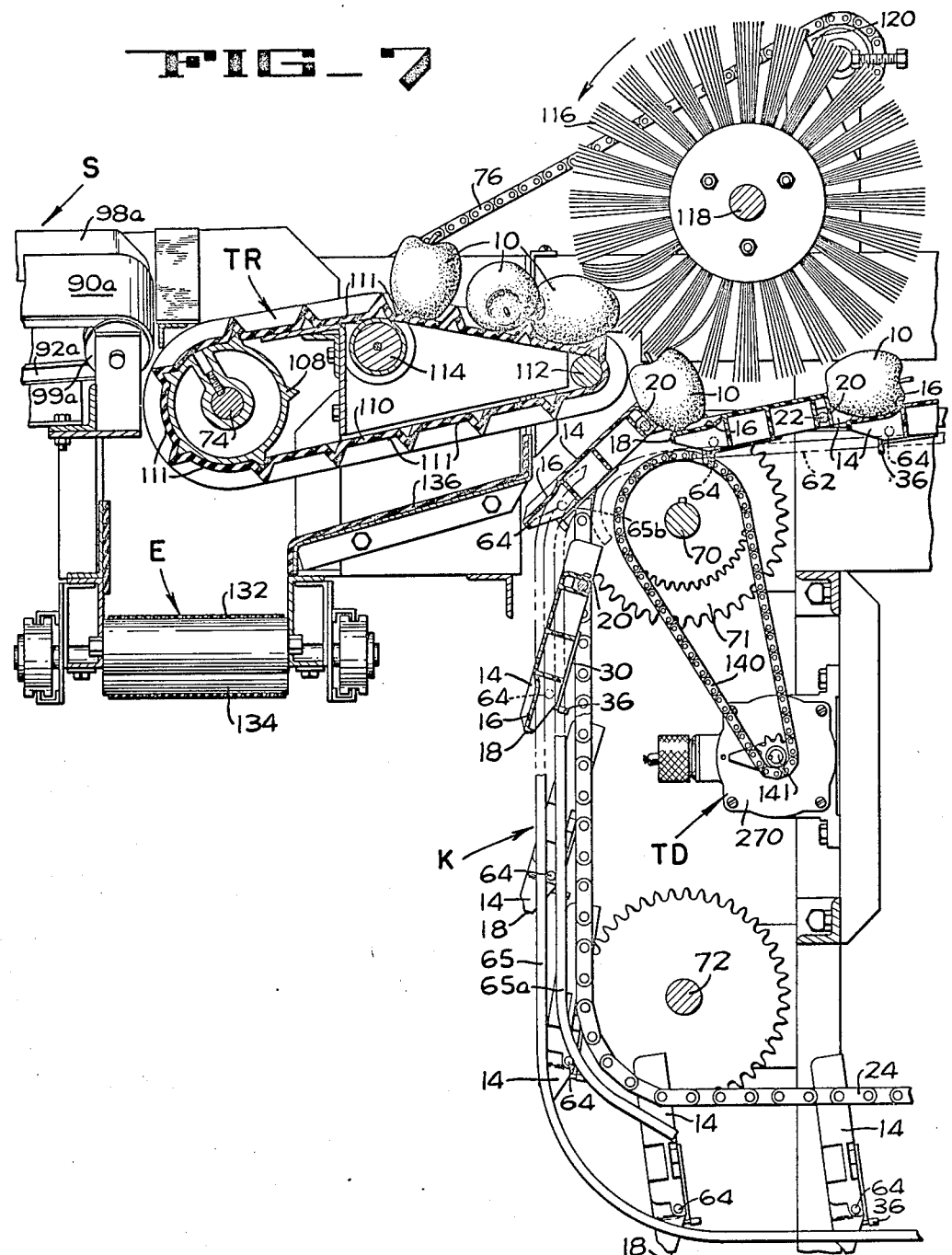

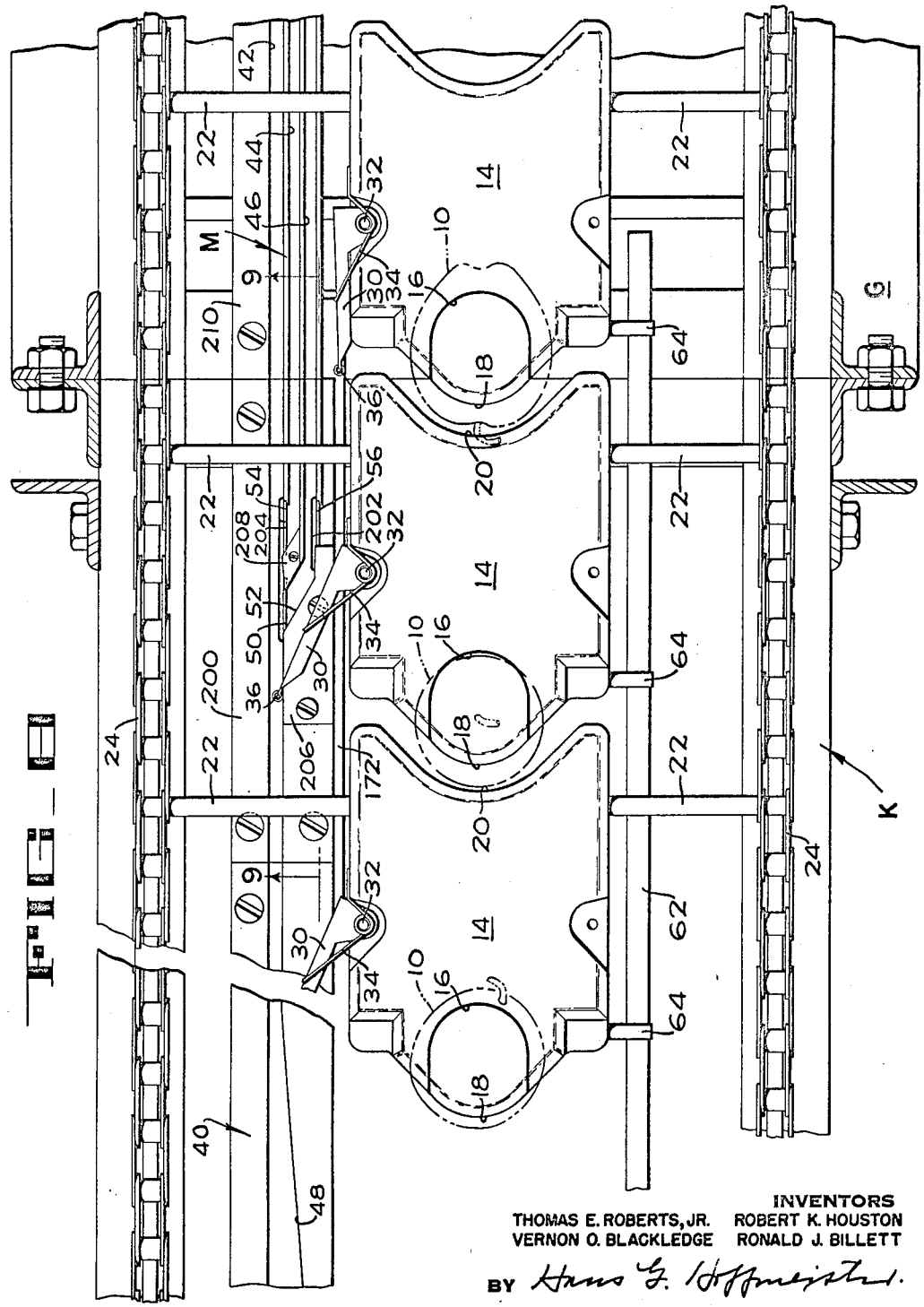

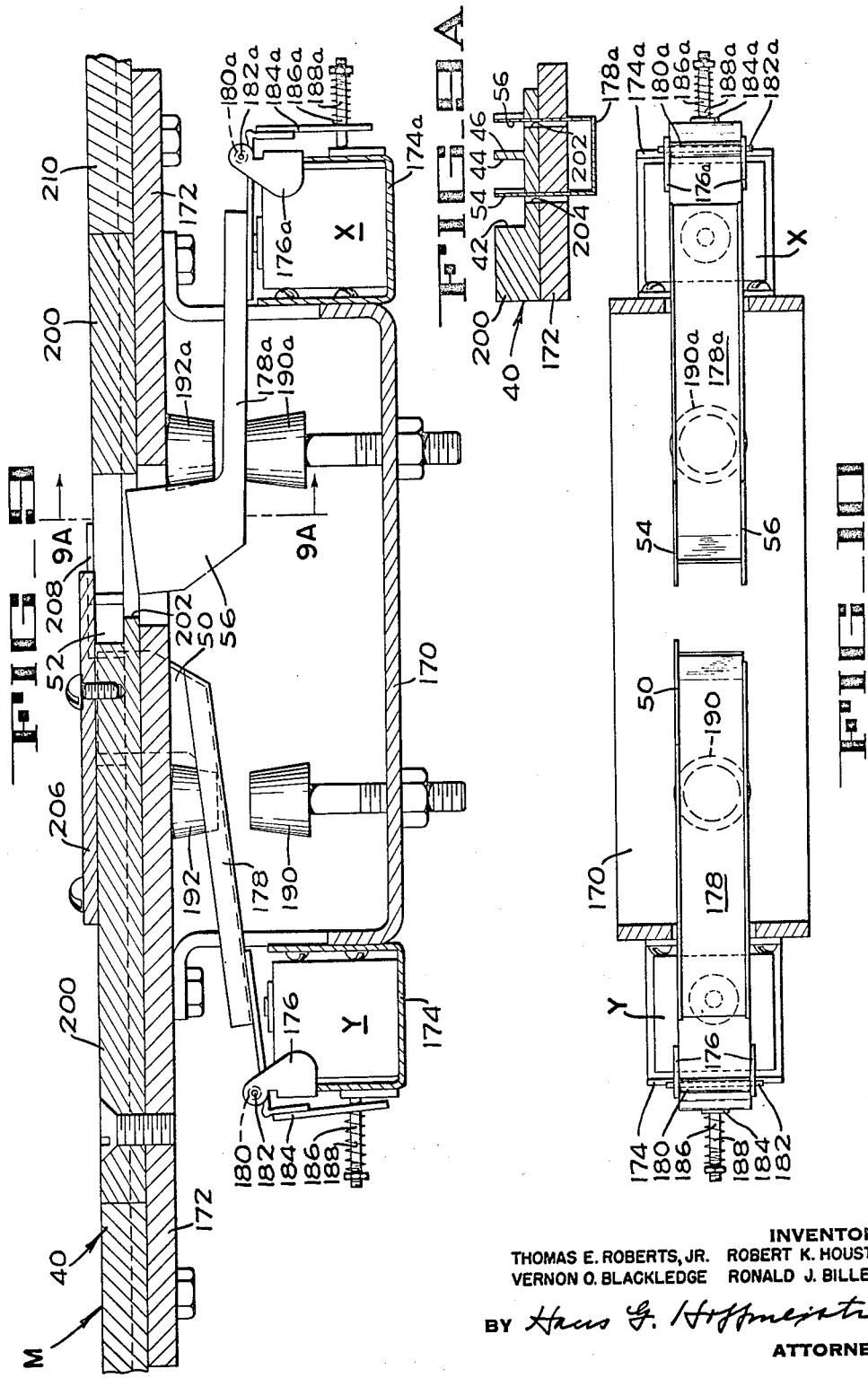

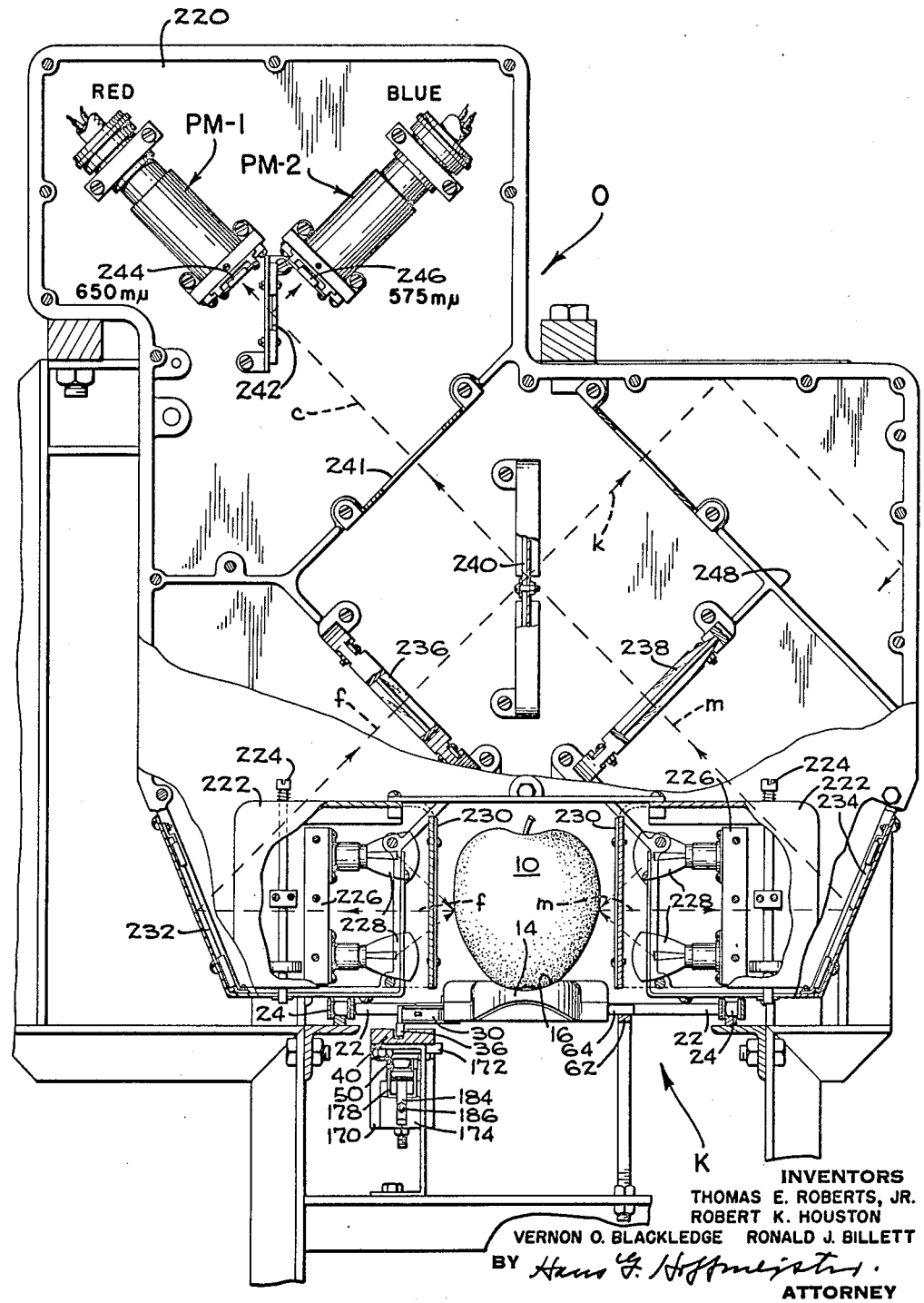

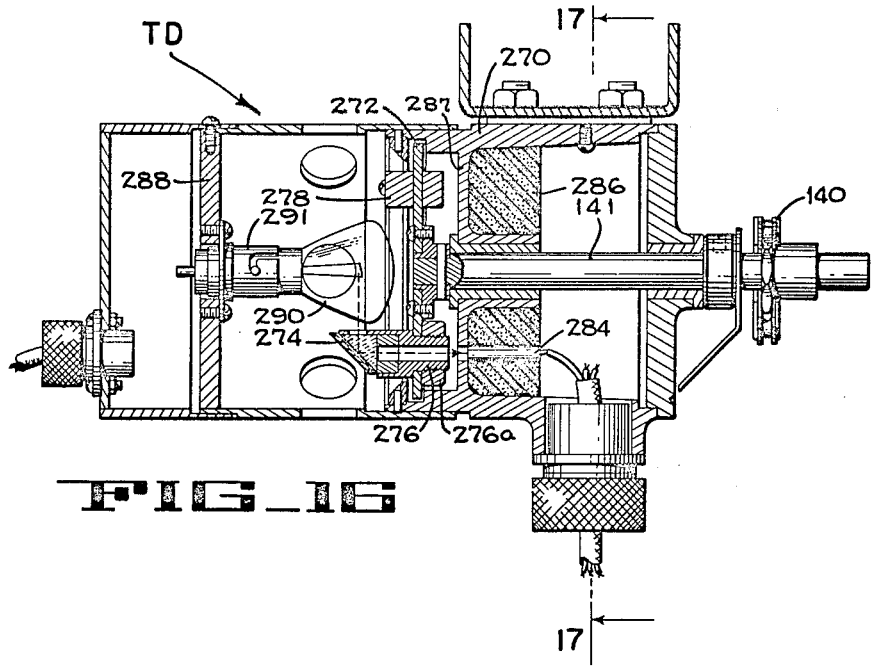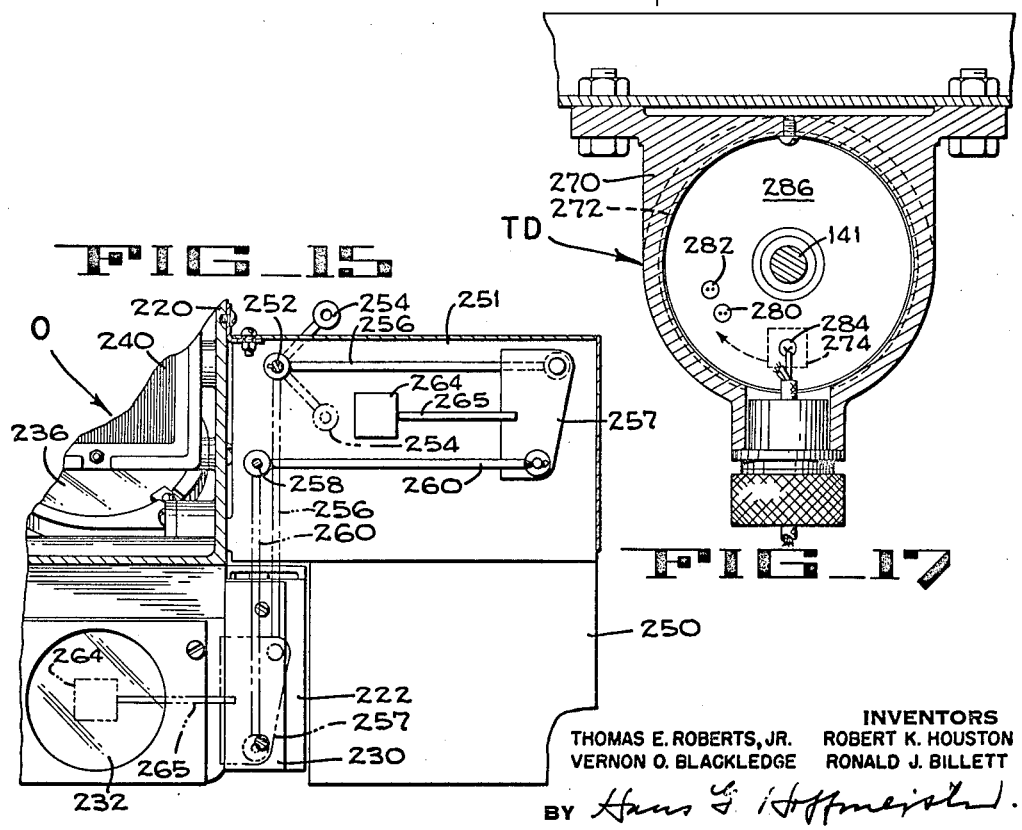

Sept. 14, 1965   T. E. ROBERTS, JR., ETAL   3,206,022
COLOR SORTING APPARATUS
Filed Oct. 10, 1961   14 Sheets-Sheet 13
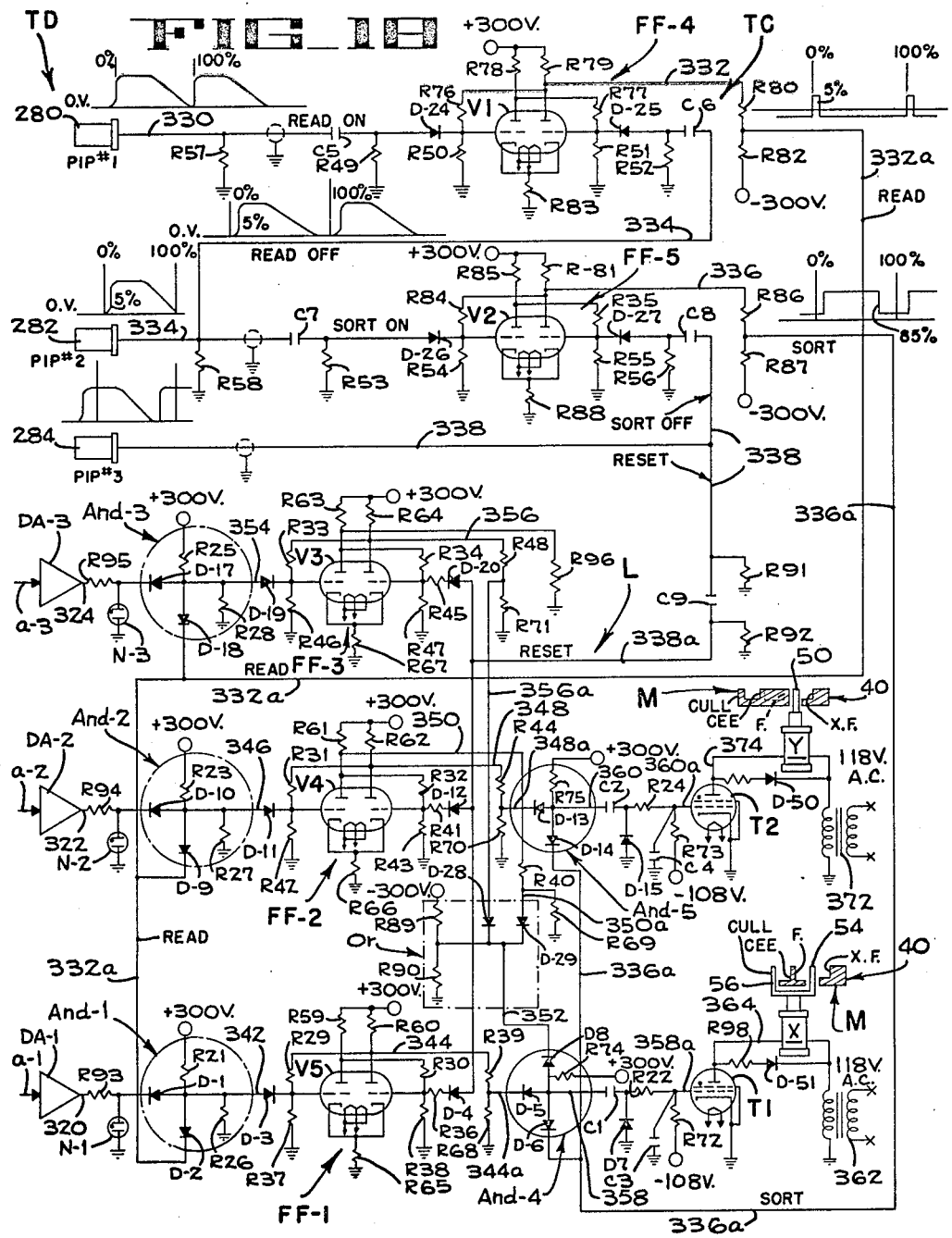
INVENTORS
THOMAS E. ROBERTS, JR.   ROBERT K. HOUSTON
VERNON O. BLACKLEDGE   RONALD J. BILLETT
BY Hans G. Hoffmeister.
ATTORNEY

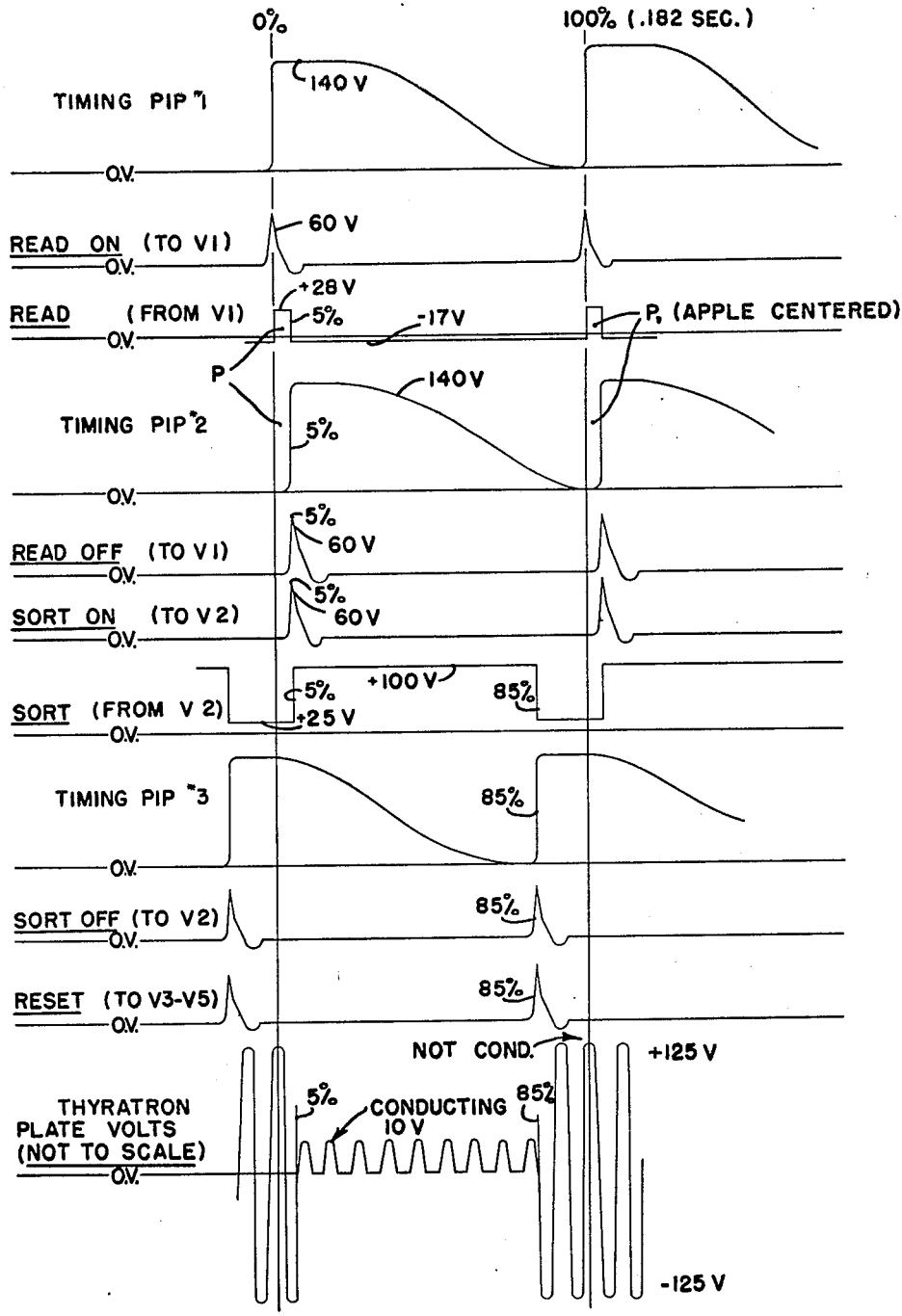

United States Patent Office 3,206,022
Patented Sept. 14, 1965

3,206,022
COLOR SORTING APPARATUS
Thomas E. Roberts, Jr., Saratoga, Robert K. Houston, Santa Clara, Vernon O. Blackledge, San Jose, and Ronald J. Billett, Santa Clara, Calif., assignors to FMC Corporation, San Jose, Calif., a corporation of Delaware
Filed Oct. 10, 1961, Ser. No. 144,179
29 Claims. (Cl. 209—74)

This invention relates to color sorting apparatus and more particularly to apparatus capable of grading objects in accordance with their color into two or more grades or classifications.

As an example of the practice of the present invention, an apparatus will be described that divides or sorts red delicious apples into four color grades ranging from a "Cull" grade, wherein apples are unacceptably green, to an "Extra Fancy" grade wherein the apples are completely ripe and very red. The apparatus of the present invention is of the type that illuminates the articles being inspected with white (broad spectrum) light, and inspects the articles in accordance with the nature of the light reflected from such articles. The reflected light is divided into two beams that are filtered to give beams having peak intensities at two different wave lengths. Such beams excite photoelectric devices (photomultiplier tubes) to provide electric signals that are a function of the intensity of the light beams at each wave length. These signals are applied to a comparison and a logic circuit forming part of the present invention, which provide sorting signals that work in conjunction with a mechanical memory device that is also part of the present invention to cause the apples to be classified individually in accordance with their individual color characteristics.

The process is continuous and the apples are transported through an inspection or scanning optical unit forming part of the present invention by means of a conveyor. It is important that the apples be loaded onto the conveyor flights while the latter are moving, and that the conveyor be capable of transporting the apples through the machine at a relatively high speed. It is also important that the conveyor flights that carry the apples through the optical scanner offer a minimum of interference or masking of the illumination and reflected light beams that determine the color grading, in order that the apples will be graded on the basis of their complete overall appearance.

Accordingly, one of the objects of the present invention is to provide an automatically loaded inspection conveyor that insures precise positioning of the apples on the flights; that can accelerate the apples from a relatively slow loading speed to a much higher inspection speed; and that offers a minimum of interference with the illumination and reflected light beams. Briefly, this is accomplished by forming the conveyor flights with very shallow pockets at the trailing ends of the flights. As the flights pass up over the conveyor pulley at the loading end, the loading end of the flight that is downstream of that being loaded by the loading conveyor, forms a temporary apple confining wall which insures that the apples will be accelerated to the speed of the main conveyor, and properly deposited in the shallow flight pockets. When the apples are carried through the optical scanning system, they are being transported at a uniform velocity, and will remain in place even though the cups in each flight are quite shallow. This insures a minimum of interference with the light beams by the conveyor flights, during the optical inspection or scanning operation.

Another object of the present invention is to provide an apple sorting system wherein the main conveyor can be set in accordance with electric signals while the apples are at the inspection station, and the main conveyor will thereafter automatically deposit the apples in the proper grade receptacles, or grade takeaway conveyors, downstream from the inspection station, this being accomplished without requiring the installation of mechanically or electrically operated sorting means at the grade receptacles or take-away conveyors. Briefly, this is accomplished by what may be termed a mechanical memory device, which provides a plurality of tracks that individually terminate at different grade receptacles or take-away conveyors. Arms on the individual conveyor flights are directed to the proper track while the flights are still at the inspection or scanning station, in accordance with sorting signals from the electronics of the apparatus. When a given track terminates, apples of the corresponding grade are released as the flights drop about their pivots.

Another object of the invention is to insure that the articles (apples) are centralized in the optical scanner during the midpoint of the portion of the cycle during which sorting signals are applied to the electrical sorting circuits. This largely reduces the effects of specular reflection which are aggravated as the apple enters and leaves the illumination light beams, and insures that classification is based on inspection of a large portion of the total area of the apple.

Still another object is to provide a grading or comparison circuit that gives reliable sorting signals, that is a simple circuit, is readily adjustable to operate at selected grade cut-off lines, and does not require the generation of ratio signals, automatic gain control, and does not require the use of a light chopper.

Another object is to provide a sorting or comparison circuit that is readily calibrated or set to produce the desired grade to grade cut-off points based on a standard color and in a very simple manner.

Another object of the invention is to provide an optical scanning unit wherein substantially all of the light that reaches the photoelectric signal producing devices is light that has been reflected from the articles under inspection.

Another object of the invention is to provide a color scanning unit that automatically averages variations in color that occurs at various zones or area of individual articles, such as apples. This is accomplished by the optical system of the present invention which combines approximately 50% of the light reflected from each of the diametrically opposite sides of the articles into a single beam. Such a beam represents the average color value of the entire apple. The optical system then splits the composite or average color value beam into two beams. Each of the latter beams are filtered to provide a beam of a predetermined wave length, each beam being received by one of two photoelectric devices such as photomultiplier tubes.

Another object of the invention is to provide means for preventing the generation of false sorting signals when no apples are under inspection.

A further object of the invention is to provide means for introducing a color standard into the optical scanner for initial calibration and adjustment of the apparatus in accordance with the selected standard color grade of an article or apple.

Still another object of the invention is to provide means for precisely controlling the effective or "read" time during which the inspection beams are converted into sorting signals.

Another object of the invention is to insure that the complete inspection, including the transmission of sorting signals to the memory gate mechanism takes place within no more than the conveyor travel distance represented by the length of one flight of the main conveyor. This insures that every apple will be individually graded.

The manner in which these and other objects may be accomplished will be apparent from the following detailed description of an apparatus embodying the present invention, which apparatus is capable of sorting apples into four color grades.

In the drawings:

FIG. 1 presents the light absorbance curves for four grades of Red Delicious apples.

FIG. 2 presents the relative response curves of photoelectric devices such as photomultiplier tubes at the two inspection wave lengths.

FIG. 2A is a table showing grade to grade response values.

FIG. 3 is a schematic diagram of the major elements of a system embodying the invention.

FIGS. 4A and 4B taken together present a plan of the conveyor apparatus of the invention.

FIG. 5 is a side elevation of the apparatus, drawn to a smaller scale than that employed for FIGS. 4A and 4B.

FIG. 6 is a fragmentary side elevation of the loading end of the apparatus showing the other side of the apparatus from that shown in FIG. 5, and drawn to a somewhat larger scale.

FIG. 6A is a section taken on lines 6A—6A of FIG. 4A showing the apple singulating belts.

FIG. 7 is a section taken on lines 7—7 of FIG. 4A showing the intermediate or transfer conveyor.

FIG. 8 is an enlarged fragmentary plan showing the track and gate mechanism forming part of the mechanical memory device.

FIG. 9 is a section taken on lines 9—9 of FIG. 8 and drawn to a larger scale, showing the gate mechanism.

FIG. 9A is a section taken on lines 9A—9A of FIG. 9.

FIG. 10 is a plan of the gate mechanism.

FIG. 11 is a front elevation of the optical system or scanner with parts broken away.

FIG. 12 is a bottom elevation of the scanner.

FIG. 13 is a side elevation of a striped or banded mirror employed in the scanner.

FIG. 14 is a schematic diagram of the illumination lamp supply circuit.

FIG. 15 is a fragmentary end elevation of the scanner showing the calibration flag insertion mechanism.

FIG. 16 is a section through the timer device.

FIG. 17 is a section taken on lines 17—17 of FIG. 16.

FIG. 18 is a schematic diagram showing the logic, multivibrator and thyratron circuits.

FIG. 19 is a timing diagram for the system.

Before discussing the apparatus of the present invention in detail, the general scheme or principle upon which the sorting is based, will be briefly explained.

Referring to FIG. 1, the curves here presented have as their ordinate what is termed the absorbance of Red Delicious apples, over the spectrum wavelength range of 500 to 800 millimicrons. The absorbance, as indicated on the ordinate of the curves, is equal to the logarithm of the reciprocal of the reflectance. It can be seen from the numerical values assigned to the ordinate of the curve, that the more the curves are displaced from the abscissa, the greater is the intensity of the light reflected by the apples at each wavelength. Thus the curves of FIG. 1 can also be treated as reflectance curves. In accordance with the present invention, advantages are taken of certain characteristics of the absorbance (reflectance) curves at two specific wavelengths. For example, it can be seen that at a wavelength of 575 millimicrons the intercepts of the curves for the Extra Fancy, Fancy, Cee and Cull grade apples are widely separated and are disposed in the order mentioned. On the other hand, at a wavelength in the order of 650 millimicrons, the intercepts of the curves are close together. In fact, the Cull and Extra Fancy curves are interchanged with respect to their relative magnitudes. In the present invention, advantage is taken on these phenomena to provide a simple and reliable grading system, as will now be briefly explained, however, examination of FIG. 1 will reveal that wavelengths other than those indicated can be used to sort Red Delicious apples.

As previously mentioned, in the present invention the composite light beam made up of equal quantities of the light reflected from opposite sides of the apples is split into two sub-composite beams. A 575 millimicron filter is interposed between one of the beams and one of a pair of photomultiplier tubes. This wavelength, for the sake of convenience, will be termed the "blue" peak wavelength. The term "blue" does not mean that the wavelength in question represents a blue color, but merely that it is displaced in the blue direction from the other inspection wavelength. The order inspection wavelength is determined by a 650 millimicron filter, and this wavelength will be termed the "red" wavelength. Again, the term "red" merely indicates that the wavelength of this beam is displaced from that of the other beam along the spectrum in the red direction. It will be understood that the filters referred to merely peak at 575 and 650 millimicrons, respectively, and actually each transmits light over a band of wavelengths centered about such peak wavelengths.

FIG. 2 illustrates the use than can be made of the light reflection information available when such filters are used in the apparatus of the invention. The ordinate of the curves of FIG. 2 can be considered to be an index representing the response or electrical output of the two photomultiplier tubes when individually activated by light at one of the previously mentioned peak wavelengths. In the left hand curve the solid lines indicate the average response for the four grades of apples in question, at the "blue" wavelength. The areas under the curves can be considered to represent the total response of the photomultiplier tube to each apple grade. The right hand set of curves represent the response of the other photomultiplier tube at the "red" wavelength. It can be seen that the response of the blue sensing photomultiplier tube is in all cases considerably higher than that of the red sensing photomultiplier tube. It can also be seen that the grade-to-grade responses at the blue end of the spectrum vary considerably, whereas the response curves at the red end of the spectrum fall close together. Advantage is taken of this characteristic in accordance with the present invention, to provide a very reliable, easily adjustable, sorting circuit. In accordance with the present invention, the output or signal from each photomultiplier tube is fed to what will be termed a color amplifier. Referring to Table I, FIG. 2A, a numerical value or index for each of the areas under the curves involved are given. These values are based on the blue response of a test or calibration Extra Fancy apple, this response having been assigned the value of 1 in the table (col. 1, "Test X.F."). In column 1 of the table, and referring to the blue photomultiplier system response, it can be seen that when the test Extra Fancy apple response has an index of 1, the Fancy apple response has an index of 1.94, that of the Cee apples is 3.02, and the Cull apple response is 3.36.

Referring to column 2 of the table, corresponding values for relatively small areas under the response curves of the red photomultiplier tube at each apple grade are given. In column 3, the red response for the test Extra Fancy apples has been adjusted to have an index of 1 so that it is thereby rendered numerically equal to the blue response for the same apple. When the red response curve for the Extra Fancy test apple is so adjusted, the red response for Fancy apples will be .96, that for Cee grade apples will be 1.00, and that for Cull apples will be 0.83. As will be seen presently, this adjustment is actually carried out in the apparatus of the invention by the simple setting of a gain control for the red photomultiplier tube.

Column 4 of Table I gives the ratio of the blue response to the adjusted red response. It can be seen that these ratios are one to one for the test Extra Fancy apples; and four to one for Culls. These ratios provide data that can be utilized in the comparison circuit of the present invention for dividing the apples into the four grades indicated. Actually as indicated in column 5 of Table I, the grade line or division line between grades is intermediate to the ratio values given in column 4 of the table. For example, Extra Fancy apples have a grade line of 1.5 to 1. This means that apples having a blue to adjusted red ratio (col. 4) of from 1 to 1 or less, up to a maximum of 1.5 to 1 will be deemed Extra Fancy. Fancy apples will have a blue to red ratio that lies in the range of 1½ to 2½ to 1. Cee grade apples will have a blue to red ratio that lies in the range from 2½ to 1 to 3½ to 1, and Cull apples will have a blue to red ratio of 3½ to 1, or higher. The circuits of the apparatus of the present invention are calibrated and adjusted to provide signals that enable grading of the apples at grade to grade differences that are in accordance with the grade lines set out in column 5 of Table I. It is to be understood that the grade lines of Table I are given by way of example. They are arbitrarily selected as a matter of judgment based on desired results for Red Delicious apples.

During a series of inspections, the outputs of the red and blue photomultiplier tubes are primarily affected by two factors, the size of the apples and their color. As the size of the apples increases, the tube outputs increase proportionately. As the color changes from red toward green the ratio of the blue response to the red response increases. The effect of apple size is eliminated by the use of a ratio monitoring circuit to be described later. Thus the classification is made on the basis of color.

GENERAL DESCRIPTION OF THE APPARATUS

A general schematic diagram of the apparatus appears in FIG. 3. Omitted from this figure is the loading and transfer conveyor system which will be described in detail presently. The main conveyor is indicated at K, this being a continuously operating endless conveyor having flights that transport the apples, indicated at 10, through the apparatus. An optical scanner O is provided which is also shown diagrammatically in the figure. This apparatus illuminates the apples one by one as they pass through it, and provide averaged inspection beams of two wavelengths as previously explained. The optical apparatus mounts two photomultiplier tubes. Photomultiplier tube PM–1 is the "red" tube, the filter of which is peaked at 650 millimicrons. Photomultiplier tube PM–2 is the "blue" tube, the filter of which is peaked at 575 millimicrons, as previously described. The output of the red photomultiplier tube PM–1 is fed into a red color amplifier, indicated diagrammatically as the red amplifier R. Similarly, the blue photomultplier tube feeds a blue color amplifier B. The outputs from the red and blue color amplifiers R and B are fed to an adder or comparison circuit forming part of the present invention and indicated generally at A. The comparison circuit A has three outputs for each apple under inspection which, as will be explained presently, are all different from one another and their values depend upon the grade of the apple. These outputs will vary from a negative to a positive voltage. The condition wherein all three outputs are zero or more negative than zero can also be considered to be an output. The outputs are fed to individual differential amplifiers DA1, DA2, and DA3. These amplifiers are of the type that rapidly change from one state to another, such as from a negative saturation voltage to a positive saturation voltage, as the signal input passes from one side of zero to the other side of zero. The outputs of the differential amplifiers are connected to a logic circuit indicated generally at L. This circuit includes gate circuits ("and" circuits and an "or" circuit) and multivibrator or flip flop circuits FF–1, FF–2 and FF–3. The logic circuit has two signal outputs, one for controlling a thyratron T1 and another for controlling a thyratron T2. In order to time the inspection apparatus and render its operation uniform, a timing circuit TC, which includes multivibrators FF–4 and FF–5 also provides signals to the logic circuit L under control of a timing device TD which is driven in synchronism with the main conveyor K. The thyratrons T1 and T2 cotrol gate solenoids X and Y, respectively. These solenoids determine which track will be entered by special sorting arms mounted on the conveyor flights, the arms entering the proper track at the time of inspection of each apple. As will be explained in detail presently, there is, in effect, one track for each of the four grades of apples being inspected, these tracks forming part of the mechanical memory device indicated generally at M. Once a flight has been associated with a given track, that flight automatically discharges its apple into the proper receptacle or grade delivery conveyor.

GENERAL DESCRIPTION OF THE CONVEYOR

Referring again to FIG. 3, the principal parts of the main conveyor K will now be described in somewhat more detail, after which a detailed description of the entire conveyor system including the loading, or transfer conveyor will be presented.

There is an individual flight 14 provided for each apple 10, and these flights successively pass through the scanning or optical system O, as indicated diagrammatically in FIG. 3. Each flight is provided with a shallow pocket 16 at the trailing end of the flight. This pocket is only deep enough to prevent the apple from bouncing or rolling after it has been positioned on a conveyor reach that runs horizontally, and at a uniform linear speed. The trailing end of each flight has a nose portion 18 that nests within a recess 20 formed on the leading edge of the flight that follows it. The purpose of this construction is to facilitate loading of the apples from a transfer conveyor onto the main conveyor K, as will be explained in detail presently. The flights are pivotally mounted on the conveyor by means of combined drive and pivot pins 22. These pins are connected to a pair of chains 24, only one of which appears in FIG. 3. The apparatus is mechanically driven by an electric motor 26 through a 20 to 1 gear reduction unit 28, which drives the conveyor chains 24 previously referred to through drive and idler pulleys. Each of the flights 14 mounts a sorting arm 30 by means of a pivot 32, and a spring 34 is provided and urges the sorting arm 30 toward the body of the flight. A pin 36 projects downwardly from the end of each sorting arm 30, for riding in the tracks of the mechanical memory device M. In the mechanical memory device a longitudinally memory rail, indicated generally at 40 is provided. This rail is provided with grooves or tracks, the longest track 42 being associated with Extra Fancy apples.

A shorter track 44 is associated with Fancy apples, whereas the shortest track 46 is associated with Cee grade apples. According to the illustrated embodiment of the present invention, no track is provided for the Culls, the arms 30 merely springing clear of the tracks in that case. As seen at the lower left of FIGURE 3, the memory rail 40 has a lead in track 48 that cocks the sorting arms 30 as they approach the sorting gates. The arms first reach a single sorting gate 50 that can open a branch or lead in channel 52 for the Cee grade track 46. Gate 50 is opened by the solenoid Y previously mentioned. In line with gate 50 is a gate 54 which forms one half of a double gate and is operated by the other solenoid X. The gate 54 provides for direct entrance into track 44 associated with the Fancy grade apples. A gate 56 is also provided that operates in unison with gate 54 under control of solenoid X. When this gate is open, sorting arms that have traversed lead in groove 52 to the Cee track 46, spring clear of the memory rail and hence do not ride in any track. This action is associated with the Cull apples.

An important part of the automatic classifying system of the invention is an auxiliary support rail 62, which is formed in several sections that terminate at the discharge or grade conveyors. Rail 62 (and its other parts not shown in FIG. 3) provides supports for pins 64 that project from the flights on the sides opposite to the sorting arms 30. A complete description of the operation of the memory or sorting system is presented later in this specification.

OTHER MAJOR UNITS OF THE SYSTEM

Other major units of the system, some of which have not been mentioned, appear in FIGS. 4A, 4B and 5. Before describing these units in detail they will be briefly mentioned in general. At the front or loading end of the apparatus of the present invention there is mounted a singulator conveyor S. The purpose of this conveyor is to remove apples from a chute or the like and arrange them in single file for inspection purposes. This conveyor includes a pair of belts traveling at different speeds and forming a trough, which causes the apples to be arranged in a single row. The singulator conveyor S carries the apples to a transfer conveyor TR. This conveyor includes a rubber pocketed belt which causes the apples that were previously arranged in a row to be equally spaced and confined. Any apples that cannot be received in pockets on the transfer conveyor TR, fall to the excess apple conveyor E, and are carried away for reintroduction into the apparatus. The transfer conveyor TR loads the apples on the flights 14 of the main conveyor K, previously described. The position of the timing device TD that controls the inspection and sorting operation is indicated in FIG. 5, it being mounted below the transfer conveyor TR.

There are four take away conveyors provided, one for each apple grade. These run transversely of the apparatus and are disposed beneath the main conveyor K. The first take away conveyor G receives the Culls, the Cee grade apples fall in the second conveyor H, the Fancy apples fall into the third conveyor I, and the Extra Fancy apples are delivered to the fourth conveyor J. The latter two conveyors are larger than the others because most of the apples will normally be either Fancy or Extra Fancy.

At the lower left of FIG. 5 is illustrated an electronic chassis and power supply cabinet U. Mounted below the optical system O is a control panel V, which provides for starting, stopping and calibrating the system. Below the control panel V is a power distribution cabinet W. Except for units U, V and W, details of which do not form part of the present invention, the various major elements mentioned above will now be described in more detail.

THE SINGULATOR CONVEYOR

As previously mentioned the singulator conveyor S includes a pair of belts that are driven at different speeds. These belts form a trough and take apples from a supply hopper (not shown) and presents them in a single line to the transfer conveyor. The construction of the singulator conveyor is illustrated in FIGS. 4A to 6A. The prime driving source for the singulator conveyor is the motor 26 and gear reduction 28 that drive the main conveyor chains 24, as previously described. Only one of the chains 24 for the main conveyor was illustrated in FIG. 3. Both of them appear at the central portion of FIG. 4A and at the right of FIG. 4B. At the forward end of the main conveyor there is mounted a combined idler and countershaft 70. This shaft carries sprockets 71 over which the chains 24 of the main conveyor are trained, as most clearly seen in FIGS. 5 and 6. Hereafter, in order to simplify the drawings and the description that follows, when the various shafts are referred to, the sprockets on the shafts will generally not be given independent reference characters, it being understood that when the shafts are part of a chain drive, the necessary sprockets are mounted on the shafts. As seen in FIG. 5, in addition to passing over the sprockets of the combined drive and countershaft 70, the chains 24 of the main conveyor are trained about idler 72, shown at the lower left of FIG. 5, and idler 72a and driver 72b, shown at the right of FIG. 5.

As previously mentioned, the shaft 70 and sprocket 71 not only serve as idlers for the main conveyor chains, but also serves as a countershaft. Referring to FIGS. 5 and 6, it being remembered that these views are taken from opposite sides of the apparatus, disposed ahead of shaft 70 is an intermediate countershaft 74, and as seen in FIG. 6, countershaft 74 is driven from the shaft 70 by an intermediate chain 76. Intermediate countershaft 74 in turn drives a shaft 78, disposed at the extreme forward end of the conveyor, by means of a chain 80. Shaft 78 is provided to mount both drive rollers for the singulator belts, and to drive the drive roller for the low speed belt of the singulator conveyor, as will be described presently.

As seen in FIG. 5, another countershaft 82 is provided adjacent the forward end of the conveyor, and the latter countershaft is driven by a chain 84 driven from the intermediate countershaft 74 previously described. As seen in the section of FIG. 6A, a sleeve 86 is rotatably mounted on the forward shaft 78, the sleeve being driven by a chain 88 from the countershaft 82. A high speed belt 90 and a low speed belt 90a are provided. A V-belt 92 is vulcanized to the inside of the high speed belt 90 at the left hand margin thereof. This belt is trained about a pulley 94 secured to a roller 96 that serves as a drive roller for the high speed belt 90. Roller 96 is keyed to the forward shaft 78. Extending rearwardly from the roller 96 is an inclined wooden guide block 98 that imparts a twist to the belt so that it forms a trough with the other belt 90a. As seen in dotted lines in FIG. 4A, at the delivery end of the high speed belt 90, an idler pulley 99 is provided for receiving the V belt 92 of belt 90. The flat part of belt 90 is guided by a rounded wooden nose formed at the end of guide block 98. Complementary drive elements are associated with the low speed belt 90a, and these are given the same reference characters as those assigned to the drive elements for the high speed belt 90, with the subscript "a" added thereto. There is one major difference, as can be seen in FIG. 6A. The pulley 94a and the roller 96a for the low speed belt 90a are keyed to the sleeve 86. Since sleeve 86 rotates freely on forward shaft 78, this construction permits the two belts 90 and 90a to be driven independently at different speeds. To summarize, chain 80 (FIG. 4A) drive forward shaft 78 and the high speed belt 90 from intermediate countershaft 74. Chain 84 drives the low speed belt 90a, the pulley of which turns freely on forward shaft 78 (FIG. 6A) from the intermediate countershaft 74, and the short auxiliary chain 88 (FIGS. 6 and 6A).

At the entrance of the forward end of the singulator conveyor S, fixed through members 104, and a threshold plate 105 (FIG. 4A) are provided so that the apples can be fed to the singulator conveyor from a chute or bin.

The chain drives just described are constructed so that the slow speed conveyor belt 90a is driven at a linear speed of approximately 37 feet per minute, whereas the high speed belt 90 is driven at a linear speed of approximately 118 feet per minute. The effective, or average speed of the two belts is therefore approximately 78 feet per minute. It is understood that these speeds are merely given by way of example and are related to the dimensions of the flights 14 of the main conveyor, and to the desired inspection speed.

THE TRANSFER CONVEYOR

The drive and construction of the transfer conveyor TR appears in FIGS. 4A to 7 inclusive. The purpose of this conveyor is to receive apples presented in single file, but at random spacing from the singulator conveyor, and to confine them in cups at uniform close order spacing, for loading onto the flights of the main conveyor. As seen in FIG. 7, a special sprocket 108 is mounted on the intermediate countershaft 74. As seen in FIG. 6, countershaft 74 is the shaft that is driven by chain 76 from the main conveyor countershaft 70, and which also drives the singulator conveyor belts. The special sprocket 108 is toothed to drive a flexible transfer conveyor belt 110, which is formed of rubber like material and is molded to provide pockets 111 for transporting apples from the singulator conveyor to the flights of the main conveyor. At the delivery end of the transfer conveyor belt 110 is an idler shaft 112, about which the flexible conveyor belt 110 is trained. An intermediate idler roller 114 provides additional support for the flexible conveyor 110.

In the example given, the transfer conveyor belt has a linear speed of 69 feet per minute, which is about 90% of the effective speed of the singulator conveyor. This insures that apples will be transported by the transfer conveyor in close order formation.

In the apparatus under description, the linear speed of the main conveyor K is 165 feet per minute, while that of the transfer conveyor is 69 feet per minute, so that the main conveyor travels almost 2½ times faster than the transfer conveyor. This requires that the apples be rapidly accelerated as they pass from the transfer conveyor belt pockets to the shallow cups in the main conveyor flights. In order to steady the apples during transfer, and to facilitate their advance between conveyors, a double brush 116 is provided. The drive for the brush 116 appears in FIG. 6, and as indicated in FIG. 7, the brush turns with the apples. The brush is mounted on a shaft 118 which is driven by the intermediate chain 76 the main countershaft 70, as previously described. An adjustable idler sprocket 120 provides for taking up wear in the chain 76. The peripheral speed of the brush is approximately 130 feet per minute.

The importance of the recesses 20 at the leading edges of flights 14 during transfer is also illustrated in FIG. 7. As the flights pass up over the sprockets 71 on shaft 70 the flights are cocked so that the leading edges 20 of the trailing flights are higher than the cups 16 of the flights that are ahead of them. This provides a temporary, but relatively deep composite pocket for receiving the apples from the transfer conveyor belt. It will be recalled that the apples must be rapidly accelerated in this zone, and the illustrated cooperation between adjacent flights provides for this acceleration without dislodgement of the apples from their ultimate intended pockets. Thus rapid acceleration of the apples can be accomplished, even though the actual pockets that support the apples are quite shallow, and so provide a minimum of light masking at the horizontal or inspection zone of the main conveyor K. The shallow nature of the pockets 16 is best seen in the lower portion of FIG. 11 which illustrates an apple under inspection in the optical system.

FIG. 7 also illustrates means on the main conveyor K for cocking the flights at the transfer conveyor, which have not been described. As the flights are raised to the sprocket 71, rearward pins 64 on the flights ride between fixed rails 65 and 65a. Inner rail 65a terminates at 65b, with which pins 64 drop on to the initial portion of rail 62, previously described. The action of these rails provides the cooperating deep cup forming action between the flights, as previously described and raises the cup at the scanning station to bring the apple into full view. The brush 116 holds the apples against their respective flights until the recesses on the trailing flights are brought up against the apples, as illustrated in FIG. 7.

THE EXCESS APPLE CONVEYOR

An excess apple conveyor E is provided to receive apples that cannot be accommodated by the belt of the transfer conveyor TR. As seen in FIG. 4A, a miter gear 122 is mounted on the main countershaft 70. This drives a longitudinal countershaft 124 by means of a miter gear 126. A driveshaft 128 for the excess apple conveyor E is driven from the longitudinal countershaft 124 by means of a chain 130. Driveshaft 128 carries a roller for the conveyor belt 132. At the other end of the conveyor E is an idler roller 134 about which the belt 132 of the conveyor is trained. As seen in FIG. 7, a chute 136 directs apples that are not pocketed in the transfer conveyor belt 110 to the belt 132 of the excess apple conveyor. Such apples are reintroduced into the system.

The drive for the timing device TD also appears in FIG. 7. This device is driven from the main countershaft 70 by means of chain 140 which drives the shaft 141 for the timing device.

THE TAKE-AWAY CONVEYORS

After the apples leave the transfer conveyor, they pass through the scanner, and are carried to the take-away conveyors for sorting. The four take-away conveyors G, H, I and J for the various grades of apples have been briefly mentioned.

In the apparatus under description, the conveyors are not driven directly from the apparatus, but are provided with separate drive means, so that their speed can be adjusted in accordance with the requirements of the installation. Referring to FIG. 5, these conveyors are provided with idler rollers 142, 144, 146 and 148 at their respective input ends, and as seen in FIG. 4B, the conveyors are provided with drive rollers 152, 154, 156 and 158 at their respective delivery ends. A common driveshaft 160, which is driven by gear reduction 162 and a motor 164 operates the take-away conveyors.

THE MECHANICAL MEMORY AND SORTING GATE APPARATUS

The purpose of this apparatus and its general mode of operation have been previously described briefly. It will now be described in more detail with reference to FIGS. 4B and 8–10. The apparatus includes the memory rail indicated generally at 40 and previously mentioned, which rail extends longitudinally along one side of the main conveyor K. Also as previously described, the memory rail includes a lead in track 48, and grading tracks 42, 44 and 46. Portions of these members also appear in FIG. 8, which is an enlarged plan of the sorting gate section of the apparatus. As seen in FIGS. 9 and 10, the single sorting gate 50, and the double gates 54, 56, previously described, are mounted on a main bracket 170 that depends from a relatively horizontal mounting rail 172 that extends along the side of the main conveyor, and also mounts the memory rail. The solenoid Y for the single gate 50, is mounted on an auxiliary bracket 174 that is secured to one leg of the main bracket 170, as best seen in FIG. 9. Pivot ears 176 extends upwardly from auxiliary bracket 174, in order to pivotally mount a combined solenoid armature and gate mounting arm 178. The single gate 50 projects from the end of arm 178. Pivot means 180 extend across the arm 178 and receive a pivot pin 182 that is carried in the pivot ears 176 of auxiliary bracket 174. A downwardly extending projection 184, at the left end of arm 178 as viewed in FIG. 9, is apertured to receive a spring post 186. A spring 188 is mounted on the spring post, and engages arm 184 to urge the gate 50 to its upper or closed position. When gate 50 is moved to its downward or open position by the solenoid Y, this brings the gate arm 178 against an adjustably mounted lower stop 190. The upper position of the gate 50 is determined by a stop 192 mounted on the memory rail support plate 172 that extends along the apparatus. The double gates 54 and 56 are controlled by the solenoid X, and these gates are mounted in the same manner as the gate 50. Accordingly, mounting elements for double gates 54 and 56 are given the same reference characters as are those for gate 50, with the addition of the subscript "a."

At the gates, the memory rail mounts a separate insert plate 200, FIG. 9, that is mounted on the rail 172 previously described. As seen in FIG. 8, slots 202, 204 are formed in the insert plate 200 for receiving the double gates 56 and 54, respectively. As seen in FIGS. 8 and 9, upper stop plates 206, 208 are fastened to the insert plate 200 and may serve in conjunction with stops 192, 192a to limit the upper motion of the gates when they are in the closed position. A memory rail extension 210 is provided which comprises a balance of the memory rails and is formed with the tracks 42, 44 and 46 previously described.

OPERATION OF THE MECHANICAL MEMORY DEVICE

Before proceeding with a detailed description of other portions of the apparatus, a brief resume of the operation of the mechanical memory device will be presented.

After the apples are loaded onto the flights 14 of the main conveyors, as illustrated in FIG. 7, the pins 64 of each flight ride along the initial section of the auxiliary rail 62. By the time the flights reach the optical system O which forms the scanner, the flights are supported on the auxiliary rail 62 in horizontal positions so that the apples rest in the shallow pockets 16 for presentation to the illumination lamps of the optical system.

Referring to FIG. 8, as the flights approach the scanner, the arms 30 ride along the rack 48 that cocks the arms so that the arms are fully cocked as they approach the gate mechanism. An apple carried by the central flight 14, illustrated in FIG. 8, will be in the inspection zone, and hence will be at the position where the sorting signals are developed, to be stored and later transferred to the respective solenoids, it being understood that in the case of Extra Fancy apples in the system being described, no sorting signal is produced. In the case of Culls, signal gate 50 is opened as well as gate 56 of the double gate which permits the pin or arm 30 to spring clear of the memory rail and ride against the side of its flight. Thus the flight is supported entirely on the initial section 62 of the auxiliary rail. As also seen in FIG. 8, section 62 terminates at the Cull conveyor G so that when the flight is disposed over the conveyor the pin 64 rides off the section 62 and the apple drops into the conveyor.

In the case of Cee grade apples, only gate 50 is open, which permits the pin on the flight arm 30 to enter the track 46. As seen in FIGS. 8 and 4B, track 46 carries the flight across the Cull conveyor G and the pin 64 is subsequently supported by an extension 62a of the auxiliary rail. As seen in FIG. 4B, track 46 stops short of the Cee grade take-away conveyor H, and the auxiliary rail section 62a also terminates at that conveyor, so that in this case the apples are dropped into the Cee grade take-away conveyor.

In the case of Fancy apples, the single gate 50 remains closed along and gate 54 of the double gate is opened (along with gate 56, but this is immaterial). Since single gate 50 is closed, the pin 36 cannot enter channel 52, and since gate 54 is open the pin is permitted to enter the track 44. Referring to FIG. 4B again, it can be seen that track 44 bridges the Cee grade conveyor H, so that even though the pin 64 drops off the end of auxiliary rail section 62a at the conveyor H, pin 36 and track 44 support the flight as it crosses the conveyor H. The pin 64 then picks up a section 62b of the auxiliary rail, and this section supports the flight even though the track 44 ends before the flight reaches the Fancy grade take-away conveyor I. Thus the flight is supported solely by the auxiliary rail section 62b until it is over the conveyor I, whereupon auxiliary rail section 62b ends and the apples are dropped into the conveyor for Fancy apples.

In the case of Extra Fancy apples, none of the gates are opened. Thus, as seen in FIG. 8, the pins on sorting arm 30 slide across the single gate 50, and the gate 54 of the double gate and remain in the Extra Fancy track 42. Again referring to FIG. 4B, it can be seen that the Extra Fancy track 42 extends completely across the conveyors G, H and I, and supports the flights even though the auxiliary rail sections do not bridge all of the conveyors. However, a terminal auxiliary rail section 62c picks up pins 64 of the flights before the flight completely traverses conveyor I. The Extra Fancy track 42 then terminates before the flight reaches the Extra Fancy take-away conveyor J. The auxiliary rail section 62c terminates when the flight is over the conveyor J, so that the Extra Fancy apples are dropped into that conveyor. With this construction, apples are graded into four grades using only two solenoids and three tracks. Furthermore, the auxiliary rail construction reduces the net length of the sorting tracks, and hence reduces the wear on the pins of the sorting arms mounted on the flights.

Table II below summarizes the operation of the memory system for each of the four grades of the apples.

*Table II.—Sorting pattern*

| Thyratron Firing | Solenoid Energized | Gate Opened | Sorting Track Used | Auxiliary Rail Sequence | Grade Apple |
|---|---|---|---|---|---|
| None | None | None | 42 | 62, 62a, 62b, 62c | XF. |
| T1 | X | 54+56 | 44 | 62, 62a, 62b | Fancy. |
| T2 | Y | 50 | 46 | 62, 62a | Cee. |
| T1 and T2 | X and Y | 50, 54 and 56 | None | 62 | Cull |

THE OPTICAL SYSTEM

Accurate and reliable operation of the electrical comparison or adder circuit of the present invention that makes possible sorting signals, require that the optical system presents substantially identical information concerning the color of the apple to each of the photomultiplier tube and filter units. This is accomplished in the present optical system by providing a composite beam made up of equal quantities of the light reflected from opposite sides of the apple. Another characteristic of the optical system of the present invention, that helps prevent the generation of false sorting signals when no apples are under inspection, is that the system eliminates substantially all direct transmission of light to the photomultiplier tubes, when there are no apples in the inspection zone of the scanner. The optical system of the present invention also provides means for initial adjustment or calibration of the gains of the individual photomultipliers.

Referring principally to FIGS. 11 and 12, the optical system or scanner O is mounted in a main housing 220, which housing is mounted above the main conveyor K. Its position is best seen in FIGS. 4A and 5, between the transfer conveyor and the Cull take-away conveyor. Although the housing does not appear in FIG. 8, it is disposed over the gate section of the memory system therein disclosed. When an apple is centered in the scanner, as indicated at 10 in FIG. 12, the pin 36 on arm 30 of the flight carrying the apple, will be close to but will not have reached the single gate 50. This portion is approximately shown in FIG. 8. Since FIG. 12 is a bottom view, the flight and gate system are not seen.

On each side of the main housing and at the lower portion thereof, are mounted two detachable lamp housings 222. As seen in FIG. 12, these housings are mounted substantially symmetrically about the optical center of the housing. The optical center may also be considered to represent the position occupied by the apple at the midpoint of the inspection or "read" portion of the cycle. Each of the detachable lamp housings 222 is mounted on the main housing by a latch mechanism 224 (FIG. 11), details of which form no part of the present invention. Each of the lamp housings contains a receptacle 226 that mounts a pair of projection type lamps 228 of the tungsten filament type. As seen in the wiring diagram of FIG. 14, the lamps are connected in series and are energized by a transformer 229. The secondary of the transformer is shunted by a bridge circuit composed of resistors R18, R19, and a potentiometer P12. With this circuit, the illumination provided by opposed banks of lights can be equalized, such equalization be important in the optical system of the present invention.

As previously mentioned, with the sorting circuit of the present invention, it is necessary that each of the photomultiplier tube and filter units receive equal quantities of the light reflected from opposite sides of the apple. If one side of the apple were emphasized more strongly than the other, the composite beam produced by the optical system would not represent a true indication of the overall color reflection characteristics of the apple necessary for reliable operation of the sorting circuits.

Referring again to FIG. 12, each of the lamp housings 222 is provided with an adjustable masking plate 230. The purpose of this masking plate is to insure that when no apple is disposed in the scanner, that there will be no light directly transmitted to the optical units of the scanner. Thus, with the masking plate 230 in place, the most divergent possible light beam indicated at 230a will merely strike the blackened wall 231 of the housing and be dissipated, and cannot directly impinge upon any of the optical elements of the unit. The optical system parts are black, so that there is little stray light. Of course, when an apple is centered in the inspection station, as illustrated in FIG. 12, the same beam of light 230a will be reflected from the left side of the apple into the optical units of the scanner.

The manner in which the optical system provides a composite beam representing equal amounts of the light from each half of the apple is illustrated in FIG. 11.

It also appears diagrammatically in FIG. 3. As the optical system is viewed in this FIG. 11, there is a left hand mirror 232 centered in the fore and aft midplane of the unit, which mirror receives the light reflected from the left side of the apple. This light is illustrated diagrammatically as a single beam $f$. A companion mirror 234 is mounted at the right side of the unit, and receives a corresponding beam of light $m$ from the right hand side of the apple. It can be seen in this figure that since the pockets 16 of the flights 14 are quite shallow, they do not mask any substantial portion of the apple from the illumination lamps, so that the maximum surface of the apple is inspected without requiring a complicated illumination system, such as a light integrating housing surrounding the apple. In addition to their being complex, it is difficult to exclude stray light from the optics in such systems. The angles of the left mirror 232 and the right mirror 234 are arranged so that the left beam $f$ passes through a converging lens 236 and the right beam $m$ passes through a companion converging lens 238. The axes of these beams intersect the center of a banded or striped mirror 240, which is mounted to bisect the angles between the beams $f$ and $m$. This mirror, the plan of which appears in FIG. 13, is formed of alternate light reflecting stripes and clear light transmitting stripes. The reflecting stripes are in the form of silver gratings, and in the instrument being described, the width of the reflecting and clear surfaces are substantially equal, and have a combined lateral dimension of 0.10 inch. Since some of the light of the right beam $m$ is reflected by the clear stripes, to insure that the banded mirror reflects and transmits equal quantities of light from beams $f$ and $m$, would require a delicate and costly manufacturing operation involving the use of stripes of different width that are carefully selected for width. This is unnecessary, because as indicated in FIG. 14 the voltages on the right and left hand lamps can be adjusted so that the intensity of the transmitted and reflected beams from the banded mirror are equal, although the illumination lamps may actually not be balanced as to intensity. When the lamps are properly adjusted, a variegated apple will give a constant color reading regardless of its orientation in the scanner. Under these circumstances, the optical system is said to direct equal portions of the light reflected from opposite sides of the apple to the filters of the photoelectric devices. This provides equality of emphasis for both sides of the apple.

When the beams $f$ and $m$ strike the banded mirror 240, approximately 50% of the beam $f$ is reflected and approximately 50% of the beam $m$ is transmitted. These beams combine to form a composite beam illustrated diagrammatically at $c$, which beam contains equal quantities of the light of beams $f$ and the light of beam $m$. This composite beam $c$ passes through a masking plate 241 and impinges upon a mirror 242. Mirror 242 may be either a half-silvered mirror or a striped mirror, its purpose being to distribute portions of the composite beam $c$, which may be called "sub-beams," or secondary beams, to a filter 244 associated with the red photomultiplier tube PM–1, and to a filter 246 associated with the blue photomultiplier tube PM–2. Filter 244 peaks at 650 millimicrons, and filter 246 peaks at 575 millimicrons when Red Delicious apples are being sorted. The filtered sub-beams that strike the active surfaces of the photomultiplier tubes may be termed "color beams". Different filters will most probably be used in case other types of apples are inspected, it being understood that the above values are merely given as examples for the Red Delicious apple.

Returning to the striped or banded mirror 240, in addition to reflecting approximately 50% of the light from the left beam $f$, this mirror transmits approximately 50% of that light. Also, in addition to transmitting approximately 50% of the light from the right beam $m$, this mirror reflects approximately 50% of that light. Thus another composite beam $k$ is produced which strikes the walls of a light trap 248 formed in the housing, the walls being blackened so as to dissipate such unwanted light.

In order to provide for calibration of the apparatus without requiring an actual test apple for every calibration, the optical system is fitted with a test card or flag of the proper color and shape, so that when the flag is centered in the scanner, it will give the same reflectance characteristics as would the selected test apple, such as a very red Extra Fancy apple. Means whereby this test flag is mounted and presented to the scanner appears in FIGS. 12 and 15. An auxiliary housing 250 is mounted on the rear end of the scanner O, which housing has an upwardly projecting narrow section 251. A flag operating shaft 252 is pivotally mounted in the housing section 251, and a crank arm 254 is provided for turning the shaft. A link 256 connects to shaft 252 and extends rearwardly therefrom. Link 256 is pivoted to a cross link 257. A guide shaft 258 is also mounted pivotally in the housing and carries another rearwardly extending link 260. Link 256 is also pivotally connected to the cross link 257. The test flag 264 is mounted on an arm 265 projecting forwardly from the cross link. Links 256, 258 and cross link 257 form a parallelogram linkage. When these parts are given the position shown in solid lines in FIG. 15, the flag 264 is retracted. When it is decided to calibrate the apparatus, crank 254 is operated to adjust the positions of the links to that shown in the broken links in FIG. 15, with which the flag 264 is centered in the scanner, and represents an optical substitute for an apple (such as a very red Extra Fancy) in order that the unit may be calibrated.

THE TIMER DEVICE

The timer device insures that electrical sorting signals will be developed when the apple is properly positioned in the scanner, and that these signals will be timed for proper operation of the gates while the flight containing the apple under inspection is adjacent the gates, and before the pins on the flights reach the gates. The timer also resets the electronics, to ready it for the next inspection.

Referring to FIGS. 16 and 17, the timer device TD is mounted in a housing 270. The shaft 141 of the timer is driven by a chain 140, previously described, which chain is driven by the main countershaft 70 of the main conveyor as has been described in connection with FIG. 7. Thus the operation of the timing device is synchronized with that of the main conveyor, which is necessary in order that the electric signals be properly timed relatively to the position of the conveyor flights and the gates of the memory unit. For example, if the nominal flight spacing is 6", when the main conveyor is running at 165 ft./min., the timer will be timed to rotate 330 r.p.m.

Within the housing of the timing device is a timing disc 272 secured to the inner end of shaft 141. A mirror or prism 274 is mounted on one edge of the disc by means of a threaded sleeve 276 and a nut 276a. The prism and its mounting are counterbalanced by a weight 278 secured to the timing disc. Fixed in the housing are three photocells 280, 282, and 284, of the semi-conductor type, which have their active surfaces (such as cadmium sulfide) facing the disc. These units are mounted in shock absorbing material such as a sponge rubber ring 286 secured in the housing. The housing is formed with a radial web 287 which is apertured at the active face of each of the photocells, so that light may be transmitted to the cells through the sleeve 276. In order to provide a source of illumination for the photocells, a lamp socket 291 is mounted in a plate 288 secured in the housing, and an illumination lamp 290 of the tungsten filament type is mounted in the socket. As indicated in FIG. 16, light from the lamp 290 is reflected from the prism 274 to provide an axial beam that passes through sleeve 276. As the timing disc 272 rotates, this beam passes through the apertures in web 287 and successively strikes photocells 280 (Pip #1), 282 (Pip #2) and 284 (Pip #3), in the order named. The angular spacing between these photocells represents the time base for the individual portions of each cycle, and the speed of the timer device to the main conveyor is selected so the total time base is correlated with the time that it takes a single flight to pass a given point, such as the inspection station. The manner in which the signals from the photocells are utilized will be explained in connection with the description of the logic circuit L.

THE PHOTOMULTIPLIER TUBES AND COLOR AMPLIFIERS

Referring to the schematic diagram of FIG. 3, it can be seen that the red photomultiplier tube PM-1 connects to the red color amplifier R, and that the blue photomultiplier tube PM-2 connects to the blue color amplifier B. The principal function of the red and blue color amplifiers R and B is that of providing a high impedance input for receiving the color signals from the photomultiplier tubes, while providing a low impedance output for driving the adder circuit, all while maintaining operating stability.

It has been previously mentioned that the color signal outputs of the photomultiplier tubes are relatively adjustable, in order that the outputs of the two color amplifiers can be matched when a test Extra Fancy apple is under inspection. This is accomplished by adjusting the high voltage supplies to the photomultiplier tubes. In the present circuit, a high voltage of negative 1100 volts D.C. is impressed upon the high voltage line 300 from the power supply. Details of the high voltage power supply and of other power supplies required in the system are not described, because such power supplies, regulated or unregulated, are conventional and form no part of the invention. A potentiometer P1, connected as a rheostat, adjusts the voltage for the red photomultiplier tube, whereas a potentiometer P2, similarly connected, adjusts the voltage for the blue photomutliplier tube, it being recalled that the output of the red photomultiplier must be adjusted relative to that of the blue tube as part of the calibration procedure.

The red color amplifier R is a high gain amplifier having an internal gain of 15 thousand, but a negative feed back connection is provided such that the overall gain of the circuit is plus 1. The color voltage signal from the red photomultiplier tube connects to the input of the red amplifier R by means of line 302. The power supplies, including the B plus and filament connections for this and other amplifiers to be described are not illustrated, as mentioned above. A negative bias voltage source of minus 300 volts D.C. is provided in line 304 associated with the red color amplifier. A line 305 is connected from the output line r of the red color amplifier to a potentiometer P4 and a resistor R4 connected to the −300 volt line 304. These constitute a combined inverse feed back and zero bias adjustment for the red color amplifier. This adjustment is made so that the amplifier has a zero output for a zero input. The inverse feedback circuit causes an overall red amplifier gain of plus 1. For example, if the signal from the red photomultiplier tube PM-1 is minus 8 volts, the voltage on the output line r of the red color amplifier will also be minus 8 volts, and this voltage will be applied to one side of the adder circuit A. As previously described in connection with the reflectance curves of FIGURE 2, the variations in the output of the red color amplifier R due to the variations in color of the apples under inspection are small. In operation, the greatest part of the variation in the output of the red color amplifier results from changes in size of the apples under inspection. The outputs of this amplifier range roughly from minus 8 volts for small apples, to minus 20 volts for the largest apples normally encountered.

Associated with the red color amplifier is a no apple compensator, or open pocket color circuit. Although the flights 14 which provide the pockets that carry the apples through the scanner are formed with a black, nonreflecting surface, some light is reflected from the open pockets into the optical system and reaches the two photomultiplier tubes. This would cause no difficulty if it were not for the fact that the photomultiplier tubes are extremely sensitive, and because of the filters' response to different parts of the spectrum. Light reflected from the open pockets is somewhat more intense in the blue portion of the spectrum than in the red portion thereof. Under these circumstances, a differential signal would be produced by the photomultiplier tubes from an open pocket, falsely indicating that a very green apple is under inspection. If by any chance such signal approaches the threshold value of the system, a classifying signal could be transmitted to the solenoids that operate the gates, and cause unnecessary wear on these units due to operating when no apple is under inspection. In order to prevent this from occuring, an auxiliary bias is provided by a resistor R5 and a potentiometer P5 connected to the minus 300 volt supply. Thus a small bias voltage is applied to the input line 302 of the red color amplifier through a resistor R6 connected to the slider of the potentiometer, there also being a voltage divider bleeder resistor R7. For example, this auxiliary bias signal might result in a 10 percent additional output of the red amplifier over the output of the blue amplifier under open pocket conditions. When this compensating bias adjustment is properly made, no sorting signals will be produced when an empty pocket passes through the scanner.

As previously mentioned, the output line r of the red color amplifier connects to one side of the adder of comparison circuit A. Since the output voltages of both photomultipler tubes are negative, and since the red amplifier R has a gain of plus 1, the color signal voltages in line r are also negative. The color signal voltages of line r are applied to three fixed resistors R11, R12 and R13 forming legs of the adder circuit A; the other legs receive inputs from the output of the blue color amplifier B, as will be described presently.

The signal from the blue photomultiplier tube PM-2 is applied to the input of the blue color amplifier B by means of line 312 and resistance R1. The blue color amplifier has a gain of minus 2, and since the signal inputs from the blue photomultiplier tube are minus, the output line b of the blue color amplifier provides positive color voltage signals, as indicated in FIGURE 3. In order to stabilize the blue color amplifier and provide a high impedance input and a low impedance output, negative feed back is applied to the input of the amplifier by a resistance R2 connected from the output line b to the amplifier input line. The feed back is designed so that the gain of the blue amplifier in minus 2, as mentioned above. In order to provide a zero bias adjustment for the blue amplifier, so that when a 4 volt input color signal is received (for example) an 8 volt output will appear on output line B, a line 316 connects to a plus 300 volt D.C. voltage source. The selected bias voltage is determined by a voltage divider made up of a resistance R3 and a potentiometer P3 connected to ground. The slider of the potentiometer directs the bias voltage directly to the amplifier input. Since color amplifier B must supply voltage at a power level sufficient to drive the potentiometers of the adder circuit, (one leg of each potentiometer being grounded) the blue color amplifier has somewhat higher power capabilities than does the red color amplifier.

The output line b of the blue color amplifier connects to each of the grounded graded control potentiometers P6, P7 and P8. The sliders of these potentiometers connect to the other side of the adder or comparison circuit through adder resistor R8, R9 and R10, respectively. These adder resistors have resistances that are identical with those of adder resistors R11, R12 and R13 connected to the output line r of the red color amplifier. The potentiometer P6 can be set to apply a selected fraction of the blue color signal to an adder output line a-1, connected at the junction of serially connected adder resistors R11 and R8. Similarly, potentiometer P7 will be set to pick off a somewhat smaller fraction of the output voltage on line b, and supply such voltage fraction to a second adder output line a-2 through adder resistor R9. Finally, the third potentiometer P8 will be set to supply a still smaller fraction of the output voltage of line b to a third adder output line a-3, through the adder resistor R10. As previously indicated, the first output line a-1 forms the input for the differential amplifier DA-1, adder output line a-2 forms the input for differential amplifier DA-2, and adder output line a-3 forms the input for differential amplifier DA-3.

These differential amplifiers (sometimes referred to as zero monitors) are high gain saturated differential amplifiers having two inputs, a signal input and an adjustable bias input. The bias input is adjusted to cause the output voltage of each differential amplifier to equal zero voltage, when the input is at zero voltage, or is grounded. These adjustable bias supplies each connect to a minus 300 volts D.C. supply, and comprises a resistance R14 and a potentiometer P9 for DA-1, a resistor R-15 and a potentiometer P10 for DA-2, and a resistor R-16 and a potentiometer P11 for DA-3. Differential amplifiers of this type have the characteristic that their outputs rapidly flip from negative saturation (−50 or more volts) to positive saturation (+50 or more volts) as the signal inputs to the amplifiers pass through zero from a slightly negative to a slightly positive voltage. For example, when these amplifiers are properly adjusted for zero conditions, a positive input signal as small as .005 volt will cause the amplifier output to pass from negative to positive saturation, whereby their outputs may swing from minus 50 volts or more to plus 50 volts or more.

THE ADDER OR COMPARISON CIRCUIT

Referring again to the adder circuit comprising adder resistors R11, R12 and R13 for the red color signals; adder resistors R8, R9 and R10 for the fractional blue color signals; and common output lines a-1, a-2, and a-3; circuits of this type have the characteristic of providing an output voltage that is half the sum of the two input voltages. For example, and referring to the adder circuit output line a-1, one input voltage to this line is applied through adder register R11 from the red color amplifier. As can be deduced from the right hand reflectance curve of FIG. 2, this voltage is largely a function of apple size, although relatively small voltage variations arise from changes in color, as previously indicated in connection with FIG. 2, col. 3, of Table I. On the other hand, the magnitude of the input voltage to the companion adder resistor R8 (from the blue color amplifier) is predetermined by the setting of potentiometer P6. This setting determines which fraction of the voltage of the blue color amplifier output line b is applied to the corresponding side of the adder circuit. As has been explained, the voltage in output line b depends not only on apple size but also on apple color, whereas that in the red color output line depend largely on apple size. By way of example, the voltages on output line b for the blue color amplifier may vary from 8 volts for a small red apple to 32 volts for a small green apple, and from 20 volts for a very large red apple to 80 volts for a very large and quite green apple.

To illustrate the operation of the adder circuit, assume by way of example, that the signal voltage from the red color amplifier R applied to output line r is minus 8 volts, which corresponds to an output of minus 8 volts from the red photomultipler tube PM-1. Assume also that the output voltage from the blue photomultiplier tube PM-2 is minus 6 volts, and since the blue color amplifier B has a gain of (−2), the voltage on output line b of the blue amplifier will be plus 12 volts. Assume further that the potentiometer P6 is adjusted to tap off ⅔ or 66% of the voltage of output line b of the blue color amplifier for application to the adder resistor R8 of the adder circuit. Under these circumstances, the adder resistor R11 will receive minus 8 volts from the red color amplifier, and the adder resistor R8 will receive ⅔ of the plus 12 volts from the blue color amplifier, or plus 8 volts. The adder circuit functions so that the voltage on the adder output line a-1 will be half the sum of these opposed input voltages. Since in this case the opposed voltages are equal in magnitude and opposite in sign, the resultant voltage on adder output line will be zero. The differential amplifier DA-1, whose input is the adder output line a-1, will now be just on the threshold of flipping. In the example given, this may be considered to be the condition that exists for an apple which is on the borderline between the grades of Extra Fancy and Fancy. Ideally, if the apple under inspection in the example given is a little on the red side of this borderline case, the blue color amplifier output will drop slightly. This renders the voltage on adder output line a-1 slightly negative, so that the differential amplifier DA-1 will remain in its negative saturated condition, which indicates the presence of an Extra Fancy apple that is just red enough to make that grade. The converse is also true, in that if the apple is on the green side of this borderline case, the blue voltage will be slightly higher, and adder output line a-1 will supply a positive voltage of DA-1. This indicates the presence of a rather red Fancy apple.

*Table III.—Comparison circuit voltages*

| | Blue: Red | Red Volt. r | Blue Volt. b | P-6 66% b-1 | Add. Sig. a-1 | P-7 40% b-2 | Add. Sig. a-2 | P-8 28.5% b-3 | Add. Sig. a-3 | Diff. Amp. |
|---|---|---|---|---|---|---|---|---|---|---|
| Test X.F | 1:1 | −8 | +8 | +5.33 | −1.33 | +3.2 | −2.4 | +2.28 | −2.86 | [1] 1 [1] 2 [1] 3 |
| XF-F | 1.5:1 | −8 | +12 | +8 | 0 | +4.8 | −1.6 | +3.42 | −2.29 | [2] 1 [1] 2 [1] 3 |
| Av. F | 2:1 | −8 | +16 | +10.6 | +1.2 | +6.4 | −0.8 | +4.56 | −1.72 | [2] 1 [1] 2 [1] 3 |
| F-Cee | 2.5:1 | −8 | +20 | +13.3 | +2.6 | +8 | 0 | +5.7 | −1.15 | [3] 1 [2] 2 [1] 3 |
| Av. Cee | 3:1 | −8 | +24 | +16 | +4 | +9.6 | +0.8 | +6.84 | −0.58 | [3] 1 [3] 2 [1] 3 |
| Cee Cull | 3.5:1 | −7.4 | +26 | +17.2 | +4.9 | +10.4 | +1.5 | +7.4 | 0 | [3] 1 [3] 2 [2] 3 |
| Av. Cull | 4:1 | −6.7 | +26.8 | +18 | +5.65 | +10.7 | +2 | +7.64 | +0.47 | [3] 1 [3] 2 [3] 3 |

[1] No effective signal output to logic circuit. (Negative)
[2] Unstable—About to flip.
[3] Flipped—Effective signal to logic circuit. (Positive)

To continue with the same specific example, assume that the next potentiometer in the line P7, is adjusted so that it picks off 40% of the voltage from the blue color output line b. Under these circumstances and with the same borderline X.F. to Fancy grade apple, the voltage on the adder output line a-2 will be equal to the sum of 40% of the plus 12 volts from the blue color amplifier, or plus 4.8 volts. The red color amplifier introduces minus 8 volts to the adder circuit as before. The resulting voltage of the adder output line a-2 will be the minus 8 volts added to the plus 4.8 volts and divided by 2, or minus 1.6 volts. Line a-2 forms the input for the differential amplifier DA-2, and since this amplifier receives a minus 1.6 voltage signal, the amplifier will be firmly maintained in its negative saturated condition. A negative voltage to this, or to any differential amplifier represents a "normal" or no color signal, with a resulting negative output of the differential amplifier. Thus it can be seen that not only is differential amplifier DA-2 in negative saturation for the borderline X.F. to Fancy apple, but it will remain at negative saturation until the voltage applied to the blue color line b is considerably higher than the +12 volts that represents a borderline X.F. to Fancy grade apple. In other words, differential amplifier DA-2 is ready and waiting for a greener apple.

Table III illustrates settings of the various potentiometers and the operation of the adder circuit for a sorting problem such as that outlined in Table I of FIG. 2 of the drawings. The voltages in each case are those commonly encountered when small apples of the various color grades are under inspection. It will be seen from examination of Table III, that for the test Extra Fancy apple, the voltage inputs for all three differential amplifiers, that is the voltages of adder output lines a-1, a-2 and a-3, are all negative. This corresponds to a "no color signal" situation, and represents inspection of an Extra Fancy apple that is redder than the minimum Extra Fancy grade requirements previously described.

Referring further to Table III, it will be noted that with apples on the borderline between Extra Fancy and Fancy, the a-1 signal voltage is zero, which indicates (as explained) that the differential amplifier DA-1 is on the threshold of flipping, and that the other differential amplifiers are in their negative saturation condition. When the voltage on adder line a-2 is zero, the apple under inspection must be greener than before, and the voltage on adder line a-1 is positive.

Differential amplifier DA-1 will have flipped, and differential amplifier DA-2 will be on the threshold of flipping. This indicates that the apple under inspection is on the borderline between the Fancy and Cee grades. Differential amplifier DA-3 will still be at negative saturation, because an apple of this color is not green enough to remove the negative voltage on adder output line a-3 supplied by the red color amplifier. Finally, when the voltage of the adder output line a-3 is zero, since potentiometer P8 only picks off 28.5% of the + blue color voltage, the apple must be quite green. In this case, the other two adder lines, whose potentiometers are set to pick off larger fractions of the positive blue output line voltages, will be strongly positive. In this case, differential amplifier DA-3 connected to adder output line a-3 will be on the threshold of flipping, whereas the other two differential amplifiers will have flipped. This represents the threshold between Cee and Cull grade apples. Thus it can be seen that by adjusting the potentiometers P6, P7 and P8, the desired grade lines between apples is readily selected. It is noted, however, that the percentage of voltages picked off by the potentiometers proportionately decreases from differential amplifier DA-1 to DA-3, and this relation is associated with the logic circuit to be described.

As mentioned, Table III gives a set of average grade and grade to grade or threshold voltages in the example being explained. The non-linear nature of the voltage changes as the blue end of the spectrum is approached is characteristic and can also be found by comparing Table IV with Table I, FIG. 2A.

Table IV gives the circuit constants for the color amplifier external connections, the adder circuit, and for the lamp wiring circuit elements of the optical system.

*Table IV.—Schematic diagram, adder circuit (FIG. 3) lamp wiring (FIG. 14)*

| Potentiometers | | Resistors | |
|---|---|---|---|
| P1, P2, P5, P3, P4, P9-P11 | 500K, 10K | R1, R7 | 500K |
| P6-P8 | 100K | R2-R5, R14-R16 | 1M |
| P-12 | 1K, 25 w. | R6 | 100M |
| | | R8-R13 | 5M |
| | | R18, R19 | 500 ohms, 25 w. |
| Condensers | | | |
| C (three) | 500 mmf. | | |

THE TIMER CIRCUIT

As has been previously mentioned, the purposes of the timer circuit is to insure that as the apple moves along with the conveyor through the scanner at its linear speed of 165 ft. per minute, a "read" period is established that is sufficiently long to develop a representative color signal from the scanner and photomultiplier tube units. Furthermore, this read period must be so timed that the apple is centered in the scanner during the midpoint of the read period. The read period should not be longer than necessary because as the apple approaches and leaves the optical axis of the scanner, problems of specular reflection are more aggravated than when the apple is centered in the scanner.

Another function of the timing circuit is to insure that a period of time called a "sort" time is provided wherein the grade signals can be applied to the thyratrons to activate the gate solenoids. The sort time will thus be long enough to permit this to occur, but must terminate before the pocket completely clears the sort area so that the apparatus can be prepared for the next pocket or flight.

The general principles of the timer circuit will first be explained with reference to the schematic diagram of FIGURE 3. The photocell 280 generates Pip No. 1 to start a cycle. The output of this photocell is connected by means of line 330 to a bi-stable multivibrator unit FF–4 forming part of the timing circuit, the circuit diagram of the multivibrator appearing in FIG. 18. Multivibrator FF–4 may be termed the "read" multivibrator. This multivibrator, or flip flop circuit, as well as the others in the system, are of the bi-stable type wherein the conducting and non-conducting characteristics of the two elements of the circuit remain unchanged until a pulse signal is applied to the grid of the non-conducting element. Such a pulse renders the non-conducting element conducting and cuts off the other element. Pip No. 1 to the multivibrator FF–4 causes the multivibrator to change state in that the output line 332 thereof, which was formerly at its low voltage phase because that side of the multivibrator is normally conducting, will now shift to a high voltage phase, which results in a steady state read signal. The read signal line 332 is connected to the three And gate circuits associated with the three differential amplifiers, namely And gate circuits And–1, And–2 and And–3. The read signal enters the respective And circuits before the maximum sorting signal has been developed at the scanner and photomultiplier units. The And circuits are thereby readied to pass on any color grade signals from the differential amplifiers to the associated logic multivibrators, which store the grade signals. Details of the operation of the And circuits, which form part of the logic circuit L will be explained presently.

After elapse of 5% of the cycle time, the total cycle time being 182 milli-seconds, the timer prism 274 will be disposed in front of photocell 282, and Pip No. 2 will be generated. Pip No. 2 is conducted to two units of the timer circuit from output line 334 of the photocell. As mentioned, the elapsed time between Pip No. 1 and Pip No. 2 is 5% of the total cycle time, or approximately 9 milli-seconds, which represents the read signal duration. The voltage of Pip No. 2 is conducted to the multivibrator FF–4 and serves as a "read off" signal, which resets the read multivibrator in the timing circuit to its previous condition whereby the voltage on the output line 332 again drops to its lower value, which does not represent a read signal.

Another branch of line 334 applies the Pip No. 2 voltage pulse to the input of the multivibrator FF–5, which may be termed the "sort" multivibrator. This Pip No. 2 signal is the "sort on" signal, and is an indication that the scanner and companion circuits will have had time to develop any sorting or grade signals required, the grade signals will have been stored in the logic multivibrators, and the system is now prepared to utilize the signals for classifying the apple under inspection. The output of multivibrator FF–5, which represents a "sort" signal, appears on output line 336. Line 336 connects to another pair of And gate circuits, And–4 and And–5, which also form part of the logic circuit L. The voltage on output line 336 of the sort multivibrator was formerly low, but it is raised upon receipt of the "sort on" signal by the multivibrator. Receipt of the sort signal from line 336 of the sort multivibrator FF–5 by the And–4 and And–5 gates, causes the gates to pass on any sort signals stored in the logic multivibrators, by way of the Or gate in one case, to the thyratrons. After the elapse of 145 milli-seconds, or 80% of the inspection cycle time, the classifying gates will have functioned and the flight will be under control of the proper tracks in the memory device. The prism 274 now transmits a beam of light to photocell 284, and Pip No. 3 is generated in the output line 338 from the photocell. This signal has a dual function. It provides a "sort off" signal which is transmitted to the sort multivibrator FF–5 and restores this multivibrator to its initial condition, in which the voltage on the sort line 336 is again at its low phase and so no longer represents a sort signal, but is ready to provide the next one. A branch of line 38 also serves as a reset line, by which the voltage of Pip No. 3 is conducted to each of the three multivibrators FF–1, FF–2, FF–3 of the logic circuit L, to reset them to what is termed their "normal" or waiting condition, in case they have been previously flipped. The timing of the unit is such that after the sort off and reset signals are generated as Pip No. 3, about 28 milli-seconds or 15% of the cycle time is available to insure that the apparatus is reset and ready for new signals received in accordance with inspection of the succeeding apple.

TIMING CIRCUIT DETAILS

A schematic diagram of the timing circuit appears in FIGURE 18. The coupling of photocells 280, 282, and 284 to the respective grids of the read and sort multivibrators FF–4 and FF–5, are conventional and need not be described in detail.

A tube VI of the read multivibrator FF–4 is a double triode and the right side of the tube will, for purposes of this description, be considered to be the side that is normally conducting. Under these conditions, due to the voltage drop in the plate load resistor R79, the voltage on the output line 332 will be in its low voltage phase, which is 95 volts D.C. The voltage on the plate output line 332 combines with a portion of a negative 300 voltage source in a voltage divider network R80, R82 so that a branch line 332a, when the right side of tube VI is conducting, is actually at minus 17 volts. Branch line 332a connects to logic multivibrators FF–1, FF–2, FF–3 through their respective And circuits. When this voltage is negative, as in the "normal" condition of the circuit, it insures that the multivibrators in the logic circuit will not be inadvertently flipped.

As previously explained, when the conveyor causes the apple under inspection to enter the inspection zone of the scanner, photocell 280 produces Pip No. 1, which initiates the read period. When the read multivibrator FF–4 receives the pulse resulting from Pip No. 1 through the grid input network connected to the grid of the left side of tube V1, the left side of the tube, which was previously cut off, is now rendered conducting. In accordance with the conventional operation of multivibrators, this causes the right side of tube V1, which was formerly conducting, to be cut off, the result being an increase in the voltage of line 332 to its maximum value of positive 180 volts. This plate voltage combines with the minus 300 volts source in a voltage divider network R80, R82, so that the voltage on the read line 322a is increased from minus 17 to plus 28 volts, and this positive voltage is thereby applied to the And gate circuits 1, 2 and 3 to ready them for passing on a sorting signal from the differential amplifiers DA1, DA2 and DA3 to their associated logic multivibrator circuits FF–1, FF–2, and FF–3.

After the apple under inspection has entered the inspection zone, has become centered therein, and has moved a predetermined distance past the center of the zone, the timing device causes photocell 282 to generate Pip No. 2, and the pulse from this pip in line 334 forms the "read off" and "sort on" signals, as previously described. The "read off" pulse from Pip No. 2 is directed to the grid of the right hand section of tube V1 of the sort multivibrator of FF-4. This causes the right hand side of the tube to resume its normally conducting state, thereby lowering the voltage on output line 332 to its previous condition, while simultaneously causing the left hand side of V1 to be cut off, ready for the next "readon" Pip No. 1.

The right side of V2 of the sort multivibrator FF-5 is also considered to be in its normally conducting state up to the reception of Pip No. 2, so that the voltage on line 336 connected to the plate of the right side of tube V2 is normally in its low voltage phase, which is plus 85 volts D.C. This voltage combines with a negative 300 volts source at another voltage divider network R86, R87, so that when the right side of V2 of the sort multivibrator is not conducting the voltage impressed on branch line 336a, which is directed to the And-4 and And-5 gate circuits, is at its low voltage phase of plus 25 volts. This voltage is of the same order as the other positive low phase or non-signal voltages that are received by the And-4 and And-5 gate circuits. However, when Pip No. 2 is developed in the photocell 282 as previously mentioned, the pulse is directed to the grid of the left side of tube V2 of the sort multivibrator FF-5. This causes the left side of the tube to conduct, thereby cutting off the right side of the tube which was previously conducting. When the right side of tube V2 is cut off by the action of tube V2 on reception of Pip No. 2, the voltage in output line 336 rises to its maximum of plus 190 volts. Under these circumstances the voltage in branch line 336a impressed upon the And-4 and And-5 gate circuits, reaches a value of approximately plus 100 volts, so that the And circuits are now set up to trigger the thyratrons T1 and T2 for firing should there be input signals to the And circuits (And-4 and And-5).

At the end of the sort period, it is necessary to reset the sort multivibrator FF-5, and as previously explained this occurs before the end of cycle of inspection by the generation of Pip No. 3 from photocell 284. The pulse represented by Pip No. 3 is conducted to the grid of the right side of tube V2 of the sort multivibrator FF-5 by line 338, and this pulse causes the right side of V2 to resume its normally conducting state, thereby lowering the voltage on line 336 and re-establishing the low phase voltage of approximately plus 25 volts on the branch line 336a that leads to the And gate circuits (And-4 and And-5). Simultaneously, a branch of line 338, which forms the reset line, passes on the pulse through condenser C9, and a branch line 338a. This pulse is applied to the grids of the right hand side of tubes V3, V4 and V5 forming part of the logic multivibrators FF-3, FF-2 and FF-1, respectively. This reset pulse in branch line 338a resets the multivibrator tubes V3, V4 and V5 so that their right sides are normally conducting, which is the state in which they are prepared for receiving and storing a sorting signal from their respective differential amplifiers.

The above operation of the timing circuit is illustrated diagrammatically in the timing diagram that forms FIGURE 19 of the drawings.

THE LOGIC CIRCUIT

The mode of operation of the logic circuit will be first described with reference to the schematic diagram of FIGURE 3, after which certain details of the circuit and their operation will be explained in connection with the circuit diagram of FIGURE 18.

Referring first to FIGURE 3, it can be seen that the logic circuit operates on information received from the differential amplifiers DA1, DA2 and DA3 by means of their respective output lines 320, 322 and 324. The logic circuit includes And gates And-1, And-2 and And-3, there being one gate associated with each differential amplifier as previously described. These gates will not pass on signals from the differential amplifiers to the logic multivibrators except during the read portion of the cycle. The logic circuit also includes the three logic multivibrators FF-1, FF-2 and FF-3, which act as grade signal storage units. Also included in the logic circuit is a single Or gate and two additional And gates, And-4 and And-5 associated with thyratrons T1 and T2, these three gates serving as primary true logic elements of the circuit.

The output of the And-1 gate connects to one side of the multivibrator FF-1 by line 342. In what has been termed the "normal" condition of circuit, this line is at its low voltage phase. As previously mentioned, the reset line 338 also connects to the other side of FF-1, as well as to the other multivibrators in the logic circuit. Although two alternately high and low output voltages are usually available from a multivibrator circuit, only one of these outputs is used in case of multivibrator unit FF-1, this being the normally low voltage output. The output of this multivibrator connects to the And-4 gate, which is a triple input gate, by means of line 344. Similarly, the output on the And-2 gate connects to multivibrator FF-2 by means of line 346, and the normally low voltage phase output of this multivibrator connects by means of line 348 to the And-5 gate. Both available outputs of FF-2 are employed in the circuit. The other output of FF-2 on line 350, is the normally high voltage phase output, which forms one of the two inputs to the Or gate. The single output of the third multivibrator FF-3, which is the normally low voltage phase output, connects by line 356 to the Or gate. The output of the Or gate connects by line 352 to the triple input And-4 gate. As previously mentioned, both And-4 and And-5 gates receive sort signals from the sort multivibrator FF-5 in the timing circuit.

The output of the triple input And-4 gate connects to thyratron T1 by line 358, and the And-5 gate output connects to thyratron T2 by line 360. The plate of thyratron T1 receives its voltage by means of a line 364, from a transformer 362 in series with the solenoid X that operates double gates 54 and 56. Similarly, the plate of thyratron T2 receives its voltage by means of a line 374, from a transformer 372 in series with solenoid Y that operates the single gate 50. The logic multivibrators FF-1, FF-2 and FF-3 act as signal storage means in that if and when sufficiently strong positive signals are developed during the read period, they are flipped and their outputs remain at their high voltage phase ready for actuation of thyratrons T1 and T2 in accordance with the action of the Or gate and the And-4 and And-5 gates upon receipt of the sort signal from timer circuit line 336. The four conditions obtainable by this circuit are (1) no thyratrons fired (Extra Fancy), (2) T1 fired (Fancy), (3) T2 fired (Cee), (4) T1 and T2 fired (Cull). The effect of these conditions is outlined in Table II, previously referred to.

Before completing the description of the overall operation of the logic circuit, reference will be made to the schematic diagram of FIGURE 18 for an explanation of certain details of such circuit.

THE AND-1, 2 AND 3 GATE CIRCUITS

The differential amplifiers will have a voltage output that ranges from approximately plus or minus 40 volts to plus or minus 65 volts, depending upon the apples under inspection and the adjustment of the circuits preceding the amplifiers. These amplifiers are connected to the And gates, And-1, And-2 and And-3, by means of current limiting resistors R93, R94, R95, and the circuits following the differential amplifiers are protected by neon tubes N1, N2, and N3 which act as voltage limiters.

The three And gates And–1, And–2 and And–3 are alike, and each is connected to the plus 300 volts supply through a resistor. For example, output line 342 of the And–1 gate connects to B plus through R21 which has a high value of resistance, and a voltage divider network is formed by R21 and R26 the latter of which is grounded. The And–1 gate includes two diodes D1 and D2, the latter receiving the signal from the read circuit, which is normally minus 17 volts, but rises to plus 28 volts during the read period. Diode D1 receives a signal from the output of the differential amplifier DA–1, which as mentioned, will normally be in the general order of minus 40 volts. The result of these inputs is that the output line 342 of the And–1 gate is normally at approximately minus 12 volts, which insures that logic multivibrator FF–1 does not flip. The And circuits have a characteristic common to such circuits in that their outputs are always controlled by the lower of the input voltage applied to them. Thus, when the read signal voltage is applied to the And–1 circuit, the input to diode D2 goes up from minus 17 to plus 28 volts, but the And circuit output line 342 remains negative, unless or until an additional positive voltage is received from differential amplifier DA–1. When and if such high voltage is received, the And gate output line 342 will then shift to approximately positive 28 volts, which will be sufficient to flip the logic multivibrator FF–1 and raise the voltage in output line 344 of that multivibrator to its high voltage phase of 260 volts. The And–2 and And–3 gates are correspondingly connected, as is evident from FIG. 18.

THE AND–4 GATE CIRCUIT

Tube V5 of the first multivibrator FF–1 is a conventional double triode, but as mentioned only the output from the plate of the normally conducting right side of the tube is utilized in the logic circuit. Line 344 previously referred to is connected to the plate of the right side of V5 and has a normal low voltage phase of 90 volts (conducting), and a high voltage phase of 260 volts (cut off). Line 344 connects to a voltage divider circuit R39, R68 from which a branch line 344a forms the actual input to the And–4 gate circuit. This input is at plus 24 volts when the right side of the tube is conducting, the normal, low voltage phase, and rises to plus 50 volts when the multivibrator FF–1 flips and the right side of the tube V5 is cut off. This And–4 gate circuit differs from those previously described in that it has three inputs instead of two inputs. The output line 358 of the And–4 gate is connected to the plus 300 volt supply through a resistor R74.

The second input to And–4 is the sort signal input which connects to diode D–6. As previously mentioned, this input has a low voltage phase of plus 25 volts and a high voltage phase of plus 100 volts. The third input to the And–4 gate circuit is by means of line 352 forming the output of the Or circuit. Normally this input is at 16 volts and rises to plus 45 volts when either of the inputs to the Or circuit is at its high positive voltage phase. When all three inputs to the And–4 gate circuit are at their maximum voltage, a positive voltage of approximately 25 volts is applied by the output line of the And–4 circuit to a condenser C1, which with resistance R22 form a time delay network. This positive voltage is impressed on a line 358a that is actually connected to the grid of thyratron T1, and cause the grid which is negatively biased from a minus 108 volt supply through a resistance R72, to go positive and fire the thyratron. The time delay circuit C1, R22 maintain a positive voltage on the thyratron grid for a period of time longer than an inspection cycle. Thus, even though the plate supply for the thyratron T1 is alternating current from transformer 362, whereupon the thyratron is automatically cut off on every negative plate voltage cycle, the output of the time delay network reestablishes conduction on the next positive plate voltage cycle. This intermittent conduction of the thyratron continues until a reset voltage is received from line 338a, which resets multivibrator FF–1 and FF–5, which in turn removes the And–4 output to the thyratrons and extinguishes them. If the conveyor is stopped between the sort-on and sort-off signals, the output of the time delay network gradually falls to zero as condensers C1 and C2 charge. This allows the thyratrons to be extinguished in a few seconds and prevents undue solenoid heating. Upon re-starting the conveyor, diodes D–7 and D–15 in the time delay networks discharge C1 and C2 to their normal ready condition in one pocket length travel time.

THE AND–5 GATE CIRCUIT

Referring to the And–5 gate circuit, in addition to the sorting signal, the And–5 gate circuit receives an input directly from the tube V4 of the second multivibrator FF–2. As mentioned, both outputs of this multivibrator are used, and the And–5 gate circuit input is from line 348 connected to the plate of the right hand tube of the V4. This side of the tube is normally conducting, with which it is at its low voltage phase of approximately 90 volts. The voltage divider network R44, R70 drops this voltage to approximately 50 volts, which is the low voltage input applied by line 348a to diode D–3 of the And–5 gate circuit. Thus, under normal conditions, the voltage on output line 360 of the And–5 circuit, which must be equal to the minimum voltage supplied thereto, is the plus 24 volts corresponding to the input voltage from the sort circuit. Output line 360 connects to a condenser C–2 and a resistor R24 which forms a time delay network that connects to the grid of thyratron T2 by means of line 360a. The low voltage of plus 24 volts is not enough voltage to overcome the negative bias on the grid of thyratron T2 from the minus 108 volt bias supplied to the grid through resistance R73. Even though the And–5 gate circuit receives a sort signal voltage of plus 100 volts during each cycle, this voltage will not be passed on by the gate unless both of its other inputs are at their high voltage phase. However, when the second multivibrator FF–2 is flipped by a signal from the differential amplifier DA–2, the right side of tube V4 is cut off, with which the voltage in line 348 connected to the plate of that side of the tube rises to plus 260 volts. The voltage divider network R44, R70 drops this to plus 50 volts on line 348a leading to the diode D–3 of And–5 gate circuit. Now when the plus 100 volt sort signal is applied to diode D–4 of the And–5 gate from the sort circuit line 336a, a pulse is transmitted from the output line 360 of the And–5 gate to the grid of the thyratron T2, through condenser C2 and resistor R24. This pulse on line 360a connected to the grid of the thyratron causes it to fire, and the time delay circuit C2, R24 keeps the thyratron grid positive during the sort period, as previously described. Thus the thyratron refires on every positive alternation of the plate supply voltage during the sort portion of an inspection cycle.

THE OR CIRCUIT

Referring to the Or circuit, the two inputs are the normally high voltage phase output of multivibrator FF–2 (tube V4) to diode D–29, and the normally low voltage phase output of multivibrator FF–3 (tube V3) to diode D–28. If either input is at its positive high voltage phase, then it is a characteristic of the Or circuit with the two diodes connected as shown, that the voltage on output line 352 of the Or gate will always be determined by the most positive input. Normally the left hand side of the tube V4 of FF–2 is cut off so that the voltage on line 350 connected to the left plate of the tube will be plus 260 volts. This voltage is reduced by a voltage divider network R40, R69 so that the normal voltage on line 350a that is actually connected to diode D–29 in the Or gate circuit will be plus 45 volts.

As indicated, the other input to the Or circuit is the input to diode D–28 which is received from the plate of the right hand side of tube V3 forming part of the third logic multivibrator FF–3. In the normal state, the right hand side of tube V3 of FF–3 is conducting, so that line 356 connected to the plate of tube V3 is at its low voltage phase, which in this case will be 90 volts. This voltage is applied through a voltage divider network R48, R71 to line 356a which forms the actual input to diode D–28 of the Or circuit. In the normal state, the input voltage on line 356a will be at its low phase of plus 16 volts. Since the Or circuit passes on the highest positive input voltage to output line 352, the latter will normally receive plus 45 volts from the input diode D–29.

The output line 352 of the Or gate circuit also receives a negative bias from the minus 300 volts supply through a voltage divider network R89, R90 which applies a voltage of negative 12 volts to the output line. It has been stated that if both the second and third mulivibrators FF–2 and FF–3 are in their normal condition, with which the right sides of tubes V4 and V3 are conducting, the input to the Or gate circuit from tube V3 of FF–3 will be at the low voltage phase, whereas the voltage input from the tube V4 of FF–2 will be at the high voltage phase. Thus, since under these conditions, even though the Or gate receives but one high voltage input, the output from line 352 of the Or gate will be a signal in the order of plus or minus 45 volts to the And–4 gate.

This condition of ±45 multivibrators FF–1 and FF–2 and the Or gate circuit, corresponds to the inspection of a Fancy apple.

If FF–3 and its tube V3 are left in their normal state with the right hand side of V3 conducting, and if FF–2 is flipped, the right hand side of tube V4, which was normally conducting, is now cut off and the left hand side of the tube conducts, dropping its voltage to the low phase. This is the side that connects to the Or gate, which drops the voltage in line 350 leading to the Or gate circuit, so that now both of the inputs to the Or circuit are at their low voltage phase, and the output of the Or circuit to line 352 and the triple And–4 gate is a low voltage. This output will prevent thyratron T1 from firing, regardless of the nature of the other inputs to the And–5 gate. This is the only time that the Or gate cuts off thyratron T1, and corresponds to inspection of a Cee grade apple.

If the third multivibrator FF–3 is also flipped, the right hand side of tube V3, which was normally conducting, is now cut off. Now the voltage on plate line 356 of tube V3 rises to its high voltage phase, so that again one of the Or input is a high voltage. Assuming that FF–2 and its tube V4 have also been flipped (and the adder circuit potentiometers are set so that FF–2 will always have flipped if FF–3 is to flip) now even though the left side of tube V4 is conducting, and the input from line 350 of that tube to the Or circuit is at the low voltage phase, nevertheless, there is one high voltage phase input to the Or gate (from FF–3, tube V3), so that again the Or gate output to the And–4 gate is at the high voltage phase, and the Or gate cannot prevent thyratron T1 from firing. This corresponds to a Cull.

Having explained certain circuit elements of the logic circuit, reference is made to Table V, which summarizes the flow of information through the logic circuit, and which is presented in lieu of a lengthy written description of each phase of operation. By reading Table V from left to right for each grade of apple, the various aspects of the logic circuit operation can be easily followed.

Table VI gives the circuit constants of the multivibrator and thyratron circuits.

A complete resume of the operation of the apparatus is given in Table VII. This resume, which appears in vertical column tabular form, makes possible the tracing of each of the four grades of apples through the machine from the photomultiplier tubes to the discharge conveyors in terms of function of the circuits and the memory device. This resume does not include reference to the operation of the singulator and the transfer conveyors, nor does it refer to the optical system, the operation of which have been previously summarized. By reading down each column of Table VII for each grade of apple, the sequence of operation of the classifying elements of the apparatus can be readily followed.

*Table V.—Information flow, logic circuit*

| Grade Apple | Diff. Amp. | M.V. State [1] | OR Inputs | AND-4 Inputs [2] | Thyr. T1 | AND-5 Inputs [2] | Thyr. T2 |
|---|---|---|---|---|---|---|---|
| X.F. | None | FF-1 344—Low FF-2 348—Low | — — | 344 Low ⎫ — ⎬ 358 | Cut Off | — 348 Low | Cut Off |
|  | Flip | 350—High FF-3 356—Low | High ⎫ Low ⎬ 352 | High ⎭ |  |  |  |
| Fancy | DA-1 Flip | FF-1 344—High FF-2 348—Low | — — | 344 High ⎫ — ⎬ 358 | Fire | 348 Low | Cut Off |
|  |  | 350—High FF-3 356—Low | High ⎫ Low ⎬ 352 | High ⎭ |  | — |  |
| Cee | DA-1 Flips | FF-1 344—High | — | 344 High ⎫ | Cut Off | 348 High | Fire |
|  | DA-2 Flips | FF-2 348—High 350—Low FF-3 356—Low | — Low ⎫ Low ⎬ 352 | — ⎬ 358 Low ⎭ |  | — |  |
| Cull | DA-1 Flips | FF-1 344—High | — | 344 High ⎫ | Fire | 348 High | Fire |
|  | DA-2 Flips | FF-2 348—High 350—Low | — Low ⎫ | — ⎬ 358 |  |  |  |
|  | DA-3 Flips | FF-3 356—High | High ⎬ 352 | High ⎭ |  | — |  |

[1] The Read signal is assumed applied to AND-1, AND-2, and AND-3 Gatse.
[2] The Sort signal is assumed applied to AND-4 and AND-5 Gates.

*Table VI.—Multivibrator and thyratron circuit, FIG. 18*

| Resistors | | Condensers | |
|---|---|---|---|
| R21–R25 | 4.7M | C1, C2 | .47 mf. |
| R26–R28, R76 | 1.5M | C3, C4 | 56 mmf. |
| R29–R35 | 8.2M | C5–C8 | .005 mf. |
| R36–R58, R91, R92 | 1M | C9 | .01 mf. |
| R59–R64 | 220K | | |
| R65–R67 | 18K | | |
| R68–R71, R93–R95 | 270K | Diodes | |
| R72, R73 | 30M | | |
| R74, R75 | 22M | | |
| R76, R77 | 6.8M | D1–D29 | IN 459 |
| R78 | 56K | D30, D31 | IN 604 |
| R79 | 33K | N1–N3 | NE-81 |
| R80, R81 | 47K | | |
| R82 | 100K | | |
| R83 | 5.6K | Tubes and Lamps | |
| R84 | 5.6M | | |
| R85 | 68K | | |
| R86 | 39K | V1–V5 | 12AX7A |
| R87 | 180K | T1, T2 | 5727 Thyratron |
| R88 | 82K | 280, 282, 284 | C1 403 Photocell |
| R89 | 44M | 228, 290 | GE #1144 Lamp |
| R90 | 2.2M | PM-1, PM-2 | #6467 Photomultiplier |
| R97, R98 | 560K | | |

*Table VII.—Resumé of operation*

| | Test X.F. | Av. Fancy | Av. Cee | Av. Cull |
|---|---|---|---|---|
| Red volt. (r) | −8 | −8 | −8 | −6.7 |
| Blue volt. (b) | +8 | +16 | +24 | +26.8 |
| a-1 volt | −1.33 | +1.2 | +4 | +5.65 |
| a-2 volt | −2.4 | −0.8 | +0.8 | +2 |
| a-3 volt | −2.86 | −1.72 | −0.58 | +0.47 |
| DA-1 | Neg. | Flips | Flips | Flips |
| DA-2 | Neg. | Neg. | Flips | Flips |
| DA-3 | Neg. | Neg. | Neg. | Flips |
| FF-1, 344 | Low | High | High | High |
| FF-2, 348 | Low | Low | High | High |
| FF-2, 350 | High | High | Low | Low |
| FF-3, 356 | Low | Low | Low | High |
| OR, 352 | High | High | Low | High |
| AND-4, 358 | Low | High | Low | High |
| T-1 | Cut Off | Fire | Cut Off | Fire |
| AND-5, 360 | Low | Low | High | High |
| T-2 | Cut Off | Cut Off | Fire | Fire |
| Solenoid X | No | Yes | No | Yes |
| Solenoid Y | No | No | Yes | Yes |
| Gate 54 & 56 | Closed | Open | Closed | Open |
| Gate 50 | Closed | Closed | Open | Open |
| Track | 42 | 44 | 46 | None |
| Auxiliary Rail | 62, 62a, 62b, 62c | 62, 62a, 62b | 62, 62a | 62 |
| Discharge Conveyor | J | I | H | G |

An attribute of the sorting system of the present invention resides in the ease and reliability of the initial adjustment or calibration of the circuit. It will be recalled that the color amplifiers R and B are stable feedback amplifiers each provided with an adjustable bias so that the individual amplifiers can be adjusted so that when their signal inputs are zero their outputs are zero. The gain of the color amplifiers will be at design conditions, namely a gain of plus 1 for the red amplifier R and a gain of minus 2 for the blue amplifier B. Once the color amplifier biases are adjusted (using precision potentiometers P4 and P3), the color amplifiers R and B, which are extremely stable because of inverse feedback, will maintain these operating characteristics almost indefinitely. The basic calibration of the system for color measurements is provided by using the test flag and the high voltage rheostats P1 and P2 for the red and blue photomultiplier tubes. This adjustment determines the basic color discrimination ratio between the two tubes for a selected color. The adjustment is simply made and will remain steady in service. All that is necessary is to connect a meter to the outputs of the red and blue color amplifiers (lines r and b) and adjust the high voltage rheostats P1 and P2 so that when the output of the red color amplifier is at one selected value that of the blue color amplifier is at another selected value. These voltages will have been determined to be the proper values when the test flag is in place to provide accurate sorting in actual operation. This adjustment also compensates for unequal light beam division in the beam splitting mirror 242 due to different reflectance and transmittal characteristics of the mirror, differences in filter losses, and differences in the response characteristics of the photomultiplier tubes. Once the simple color ratio voltage adjustment is made, the adder circuit potentiometers P6, P7 and P8 are set to provide the desired grade to grade separations.

Another advantage of this calibration and adjustment means is that reproducibility of results is readily attainable if one or more machines are employed, so that all machines will classify the apples fed through them into substantially identical groups. All that need be done is to employ precision resistors and potentiometers in the color amplifier and adder circuits, so that when the corresponding potentiometers are all set to the same resistance (or to accurate scales on the devices) the apples in all machines will be graded alike. This advantage also makes possible the mechanical coupling of a number of individual conveyors K and associated equipment including the scanners and the electronics. Under these circumstances the high voltage adjustments for the photomultiplier tubes and the color amplifier bias adjustments will remain individual. However, the adder circuits can all be incorporated in one chassis, with their potentiometers ganged together. This renders what would otherwise be a tedious and time consuming calibration operation a readily performed and dependable operation.

The use of a striped or banded mirror 240 for forming the composite beam C provides advantages that relate to calibration and sorting accuracy. A partially silvered mirror at this position would affect the spectral quality of the beams f and m reflected from the two sides of the apple somewhat differently because the reflectance and transmittance characteristics of such a mirror ordinarily vary through the visible and near infra red portions of the spectrum, so that apples having different colors, or variegated colors would not receive what has been termed equal emphasis from both sides. Such a half silvered mirror will ordinarily not produce a composite beam c that transmits 'equal portions" of the light reflected from each side of an apple toward the mirror 244 and to the photoelectric devices and their filters.

A striped or banded mirror that has substantially totally reflecting and totally transmitting (clear) areas, insofar as spectrum color response is concerned, will not materially modify the spectral characteristics of the reflected and transmitted light emanating from the apples, so that the composite beam c is an accurate representation of the color response of the entire illuminated portion of the apple. As mentioned, the only characteristic of the striped mirror that need be considered is its effect on the intensities of the beams $f$ and $m$ in reaching it, and this effect is compensated for by adjusting the relative intensities of the left and right bank of illumination lamps.

Once such a composite, total effect beam reaches the half silvered beam splitting mirror 242, the broad spectral response characteristics of this mirror for reflected and transmitted light are not of major significance. This is because the filters 244 and 246 select wavelengths at two desired peaks, and the gain of the photomultipler tubes can be adjusted as described so that their signal outputs are at the predetermined ratio that will give proper sorting when a test flag or test apple is being scanned. Thus the ability of the apparatus to produce a composite beam that equally emphasizes (equal portions from) opposite sides of the apples, and with the apples almost fully exposed because of the use of shallow pocket conveyor flights, contributes to reliable calibration and operation of the apparatus.

To provide a concrete example, assume the special case wherein an apple that is exactly half red and half green is placed in the scanner with the red side facing primary mirror 232 side and the green side facing primary mirror 234. With an "ideal" banded mirror, the clear and reflecting stripes of which have been carefully chosen as to width, the mirror will form a composite beam made up of "equal portions" of light from both sides of the apple, providing the opposed lamps are adjusted to provide equal intensities of illumination. The composite beam thus produced would result in color signal readings from the photomultiplier tube outputs and circuitry that remain unchanged as this special apple is rotated within the scanner. The same results are obtained in the present invention with a banded mirror that is not "ideal," provided the variations in reflected and transmitted intensities are corrected by adjusting the relative illumination intensities for each side of the apple.

Assume now another special case wherein the same apple is placed with its color boundaries in the vertical plane of the primary mirrors. Each primary mirror now sees (except for slight flight cup masking) a quarter of a red apple and a quarter of a green apple, but so long as the illumination lamp intensities are relatively adjusted to work properly with the banded mirror, the characteristics of the left and right beams $f$ and $m$ will now be the same, and will sum up to a composite beam that represents an apple that is half red and half green as before, and the color output readings will have been unchanged by this new orientation of the apple.

In addition to the calibration and sorting advantages mentioned, the nature of the composite beam produced in the present invention also relates to the nature of the conveyor which makes possible shallow flight pockets. For example, assume that the pockets were made deep in order to insure that the apples could be consistently loaded on the conveyor during the acceleration period following the transfer conveyor. In this case, if the half red, half green apple were disposed with its green side down, the composite beam would indicate that the apple is redder than it actually is, because the masking affects only the green color. In actual sorting, since a large number of apples are not uniformly colored but are varigated, and apparatus that will not properly scan and give truly representative reflected beams will not sort all apples to a high standard of accuracy and consistency.

In the preceding specification the red filter 244 was described as peaking at 650 millimicrons. This is merely by way of example, and the example was directed to the sorting of Red Delicious apples. It was also explained how with these apples the voltage outputs of the red photomultiplier tubes were relatively free of variation due to variation in apple color, as compared to the outputs of the blue tube which vary considerably with apple color. However, in inspecting Golden Delicious apples it is the red output that varies with apple color and the blue output is relatively free of variation due to color. In this case a red filter that peaks at 670 millimicrons has been found to give a considerable variation with color and to give good discrimination between grades.

In the Golden Delicious apple example being described, wherein the color variations in the red spectrum are predominant, the same ratio monitoring system of FIG. 3 can be used, but the settings of the gain rheostats P1 and P2 will not be the same. The relative gains of the red and blue photomultiplier tubes will now be adjusted so that the blue signal voltages, which voltages will now vary less than do the red signal voltages, will substantially correspond to the highest normally encountered red signal voltage. Assuming that the Golden Delicious apple is one wherein the red tube output voltages becomes less negative moving from Extra Fancy to Cull, the same relative settings for the adder potentiometers would be used as shown in FIG. 3.

If an article were under inspection wherein the red color variations are predominant as in the above example, but wherein the red tube output voltages become more negative moving from the best grade (Extra Fancy if it were an apple) toward the poorest grade (Cull for apples), the same relative settings of gain rheostats P1 and P2 would also be used. However, the discharge conveyors would be inverted so that the best grade article would drop into what was previously the poorest grade conveyor, so the conveyors would be re-labeled. Regardless of these varied conditions, the basic principles and mode of operation of the ratio zero monitoring system of FIG. 3 are unchanged.

To give a final example, in cases wherein variations in the red photomultiplier tube color output are predominant, as above, instead of increasing the gain of the blue photomultiplier tube so that its output voltage corresponds to the highest output voltage of the red tube, as described above, the gain of the blue tube could be adjusted to substantially correspond to the lowest output voltage of the red tube. However, the photomultiplier tube connections would be crossed from these shown in FIG. 2, so that the red tube would be connected to the color amplifier that drives the adder potentiometers P6, P7 and P8. In this final example, the dynamic range of the amplifiers would be lower than in the examples described above, and in this respect the relative settings of the photomultiplier tube gain rheostats P1 and P2 would be like that described for the sorting of Red Delicious apples. These examples further illustrate the versatility of the sorting apparatus of the present invention.

While particular embodiments of the present invention have been shown and described, it will be understood that the sorting device of the present invention is capable of modification and variations without departing from the principles of the invention, and that the scope of the invention should be limited only by the scope and proper interpretation of the claims appended hereto.

The invention having thus been described, what is believed to be new and desired to be protected by Letters Patent is:

1. Apparatus for sorting articles by color comprising an endless conveyor trained about pulleys to provide a horizontal upper reach, flight members pivotally mounted on said conveyor and formed with shallow pockets at their trailing edges, the leading edges of said flight members cooperating with the shallow pockets of adjacent flight members to form article confining walls as the flight members pass up and over the front pulley of the conveyor, means for illuminating articles in said pockets when the flight members are level on the upper reach of said conveyor, optical means for converting light reflected from opposite sides of the articles into two co-axial oppositely directed beams, two photoelectric devices, optical means for directing equal portions of the light reflected from each side of the articles toward each photoelectric device, filters for converting the light directed toward said photoelectric devices into beams of different wave lengths, said photoelectric devices converting the light at each wave length into a corresponding electric signal, circuit means for separately comparing a plurality of preselected fractions of the signal from one photoelectric device to produce a series of independent difference signals, a logic circuit for receiving said difference signals and reducing them to article sorting signals, a plurality of tracks along said conveyor each track representing a different grade of article, rider means on said flights for riding in said tracks, gate means for causing said rider means to enter selected tracks, and actuating means for said gate means controlled by the sorting signals from said logic circuit.

2. Apparatus for sorting articles by color comprising an endless conveyor trained about pulleys to provide a horizontal upper reach, flight members pivotally mounted on said conveyor and formed with shallow pockets at their trailing edges, the leading edges of said flight members cooperating with the shallow pockets of adjacent flight members to form article confining walls as the flight members pass up and over the front pulley of the conveyor, means for illuminating opposite sides of articles in said pockets when the flight members are level on the upper reach of said conveyor, means for adjusting the intensity of illumination applied to the opposite sides of the articles, optical means for converting light reflected from opposite sides of the articles into two co-axial oppositely directed beams, two photoelectric devices, optical means for directing equal portions of the light reflected from each side of the articles toward each photoelectric device, filters for converting the light directed toward said photoelectric devices into beams of different wave lengths, said photoelectric devices converting the light at each wave length into a corresponding electric signal, circuit means for separately comparing a plurality of preselected fractions of the signal from one photoelectric device with the signal from the other photoelectric device to produce a series of independent difference signals and reducing them to article sorting signals, a plurality of tracks along said conveyor each track representing a different grade of article, rider means on said flights for riding in said tracks, gate means for causing said rider means to enter a selected track, and actuating means for said gate means controlled by the sorting signals from said logic circuit.

3. Apparatus for sorting articles by color comprising an endless conveyor, said conveyor comprising rotatable pulleys at each end of said conveyor, laterally spaced flexible endless members trained about said pulleys and having horizontal upper reaches, means for driving one of said pulleys, flight members pivotally mounted between said flexible members by pivots that are spaced from the leading ends of said flight members, a shallow article receiving pocket formed at the trailing edge of each flight member, the leading portion of each flight member extending forwardly of its pivots with the leading edge of each flight member being disposed relatively close to the trailing edge of the adjacent flight member, said leading edges of the flight members forming article confining walls that cooperate with the article receiving pockets of the adjacent flight members as said flight members pass upwardly and over one of said pulleys, means for supplying articles between the leading and trailing edges of said flight members, means for releasably maintaining said flight members in a horizontal position as they are carried along the upper reach of said flexible members, and means for optically inspecting articles resting in said shallow pockets of the flight members.

4. Apparatus for sorting articles by color comprising an endless conveyor, said conveyor comprising rotatable pulleys at each end of said conveyor, laterally spaced flexible endless members trained about said pulleys and having horizontal upper reaches, means for driving one of said pulleys, flight members pivotally mounted between said flexible members by pivots that are spaced from the leading ends of said flight members, the trailing edge of each flight having a concave nose portion with a shallow article receiving pocket formed at the trailing edge of each flight member at said nose portion, the leading portion of each flight member extending forwardly of its pivots, the leading edge of each flight member being concave and disposed close to and interfitting the convex nose portion of the trailing edge of the adjacent flight member, said concave leading edges of the flight members forming article confining walls that cooperate with the article receiving pockets of the adjacent flight members as said flight members pass upwardly and over one of said pulleys, means for supplying articles between the leading and trailing edges of said flight members, means for releasably maintaining said flight members in horizontal position as they are carried along the upper reach of said flexible members, and means for optically inspecting articles resting in said shallow pockets of the flight members.

5. Apparatus for sorting articles by color comprising an endless conveyor, said conveyor comprising rotatable pulleys at each end of said conveyor, laterally spaced flexible endless members trained about said pulleys and having horizontal upper reaches, means for driving one of said pulleys, flight members pivotally mounted between said flexible members by pivots that are spaced from the leading ends of said flight members, a shallow article receiving pocket formed at the trailing edge of each flight member, the leading portion of each flight member extending forwardly of its pivots with the leading edge of each flight member being disposed relatively close to the trailing edge of the adjacent flight member, said leading edges of the flight members forming article confining walls that cooperate with the article receiving pockets of the adjacent flight members as said flight members pass upwardly and over one of said pulleys, a plurality of tracks at one side of the upper reach of flight members, laterally movable support means on each flight member for riding in one of said tracks for releasably maintaining said flight members in a horizontal position as they are carried along the upper reach of said flexible members, gates for the entrance ends of said tracks, said tracks terminating at different locations along the conveyor, means for optically inspecting articles resting in said shallow pockets of the flight members, and means for controlling said gates in response to the inspection.

6. Apparatus for sorting articles by color comprising an endless conveyor, said conveyor comprising rotatable pulleys at each end of said conveyor, laterally spaced flexible endless members trained about said pulleys and having horizontal upper reaches, means for driving one of said pulleys, flight members pivotally mounted between said flexible members, a shallow article receiving pocket formed in each flight member, a plurality of tracks at one side of the upper reach of flight members, laterally movable support means on each flight member for riding in one of said tracks for releasably maintaining said flight members in a horizontal position as they are carried along the upper reach of said flexible members, gates for the entrance ends of said tracks, said tracks terminating at different locations along the conveyor, means for optically inspecting articles resting in said shallow pockets of the flight members, and means for controlling said gates in response to the inspection for directing said flight member support means to selected tracks.

7. Apparatus for sorting articles by color comprising an endless conveyor, said conveyor comprising rotatable pulleys at each end of said conveyor, laterally spaced flexible endless members trained about said pulleys and having horizontal upper reaches, means for driving one of said pulleys, flight members pivotally mounted between said flexible members, a shallow article receiving pocket formed in each flight member, a plurality of tracks at one side of the upper reach of flight members, laterally movable support means on one side of each flight member for riding in one of said tracks for releasably maintaining said flight members in a horizontal position as they are carried along the upper reach of said flexible members, gates for the entrance ends of said tracks for directing said flight member support means to selected tracks, a plurality of article receiving means disposed along said conveyor, each of said tracks terminating at one of said article receiving means, fixed flight support means on the other side of each flight member, an auxiliary rail for supporting said fixed flight support means, said auxiliary rail being interrupted at said article receiving means, means for inspecting articles resting in said shallow pockets of the flight members, and means for controlling said gates in response to the inspection.

8. Apparatus for sorting objects by color comprising conveyor means for presenting the articles to an inspection station, means for illuminating the articles at the inspection station, a pair of photoelectric devices, optical means for directing equal portions of the light reflected from each side of the articles toward each photoelectric device, filters for converting the light directed toward said photoelectric devices into beams of different wave lengths, said photoelectric devices converting the light at each wave length into a corresponding electric color signal, amplifiers for each color signal, a comparison circuit including a plurality of potentiometers connected to pick off the signal from one photoelectric device, said potentiometers having their sliders set for providing different preselected fractions of the signal from said one photoelectric device, a pair of resistors serially connected between the slider of each potentiometer and the signal output from the other photoelectric device, the junction of each pair of serially connected resistors providing signals that are functions of the difference between said plurality of preselected fractions of the signal from said one photoelectric device and the signal from the other photoelectric device, a logic circuit for receiving said difference signals and reducing them to sorting signals, and means controlled by said sorting signals for sorting articles on said conveyor.

9. Apparatus for sorting objects by color comprising conveyor means for presenting the articles to an inspection station, means for illuminating the articles at the inspection station, a pair of photoelectric devices, optical means for directing equal portions of the light from each side of the articles toward each photoelectric device, filters for converting the light directed toward said photoelectric devices into beams of different wave lengths, said photoelectric devices converting the light at each wave length into a corresponding electric color signal, an amplifier for each color signal, means for biasing said color signal amplifiers to produce a zero output voltage upon receiving a zero input signal, a comparison circuit including a plurality of potentiometers connected to pick off the signal from one photoelectric device, said potentiometers having their sliders set for providing different preselected fractions of the signal from said one photoelectric device, a pair of resistors serially connected between the slider of each potentiometer and the signal output from the other photoelectric device, the junction of each pair of serially connected resistors providing signals that are functions of the difference between said plurality of preselected fractions of the signal from said one photoelectric device and the signal from the other photoelectric device, a high gain saturating differential amplifier for receiving each of said difference signals, means for biasing said differential amplifiers so that their outputs flip rapidly from the negative to positive saturation as said difference signals pass through zero, a logic circuit for receiving the signal outputs of said differential amplifiers and reducing them to sorting signals, and means controlled by said sorting signals for sorting articles on said conveyors.

10. Apparatus for sorting objects by color comprising conveyor means for presenting the articles to an inspection station, means for illuminating the articles at the inspection station, a pair of photoelectric devices, optical means for directing equal portions of the light from each side of the articles toward each photoelectric device, filters for converting the light directed toward said photoelectric devices into beams of different wave lengths, said photoelectric devices converting the light at each wave length into a corresponding electric color signal, an amplifier for each color signal, means for biasing said color signal amplifiers to produce a zero output voltage upon receiving a zero input signal, a comparison circuit including a plurality of potentiometers connected to pick off the signal from one photoelectric device, said potentiometers having their sliders set for providing different preselected fractions of the signal from said one photoelectric device, a pair of resistors serially connected between the slider of each potentiometer and the signal output from the other photoelectric device, the junction of each pair of serially connected resistors providing signals that are functions of the difference between said plurality of preselected fractions of the signal from said one photoelectric device and the signal from the other photoelectric device, a high gain saturating differential amplifier for receiving each of said difference signals, means for biasing said differential amplifiers so that their outputs flip rapidly from the negative to positive saturation as said difference signals pass through zero, a logic circuit for receiving the signal outputs of said differential amplifiers and reducing them to sorting signals, a timer circuit synchronized with said conveyor means for producing a read signal during an early portion of an inspection cycle and a sort signal during a later portion of the cycle, means for introducing said timing signals to the logic circuit, and means controlled by said sorting signals from the logic circuit for sorting articles on said conveyors.

11. Apparatus for sorting articles by color comprising rotatable pulleys at each end of said conveyor, laterally spaced flexible endless members trained about said pulleys and having horizontal upper reaches, means for driving one of said pulleys, flight members pivotally mounted between said flexible members, a shallow article receiving pocket formed in each flight member, a plurality of tracks at one side of the upper reach of flight members, gates for the entrance ends of said tracks, said tracks terminating at different locations along the conveyor, an arm pivoted on one side of each flight member, a support pin extending downwardly from the end of each arm for engaging the bottoms of said tracks to support the flight members along the upper reach of said conveyor, spring means for urging the pins of said arms against the sides of said gates, means for optically inspecting articles resting in said shallow pockets of the flight members, and means for lowering said gates in response to the inspection.

12. Apparatus for sorting articles by color comprising rotatable pulleys at each end of said conveyor, laterally spaced flexible endless members trained about said pulleys and having horizontal upper reaches, means for driving one of said pulleys, flight members pivotally mounted between said flexible members, a shallow article receiving pocket formed in each flight member, a plurality of tracks at one side of the upper reach of flight members, gates for the entrance ends of said tracks, article receiving means along said conveyor, said tracks each terminating at one article receiving means, an arm pivoted on one side of each flight member, a support pin extending downwardly from the end of each arm for engaging the bottoms of said tracks to support the flight members along the upper reach of said conveyor, spring means for urging the pins of said arms against the sides of said gates, a flight support pin on the other side of each flight member, an auxiliary rail for supporting pins, said rail being interrupted at each of said article support means, means for optically inspecting articles resting in said shallow pockets of the flight members, and means for lowering said gates in response to the inspection.

13. Apparatus for sorting objects by color comprising conveyor means for presenting the articles to an inspection station, means for illuminating the articles at the inspection station, optical means for converting light reflected from opposite sides of the article into two co-axial oppositely directed beams, a pair of photoelectric devices, optical means for directing equal portions of the light reflected from each side of the articles toward each photoelectric device, filters for converting the light directed toward said photoelectric devices into beams of different wave lengths, said photoelectric devices converting the light at each wave length into a corresponding electric signal, a comparison circuit including means for providing a plurality of preselected fractions of the signal from one photoelectric device, said comparison circuit separately comparing said plurality of preselected fractions of the signal from said one photoelectric device with the signal from the other photoelectric device to produce a series of independent difference signals, a logic circuit for receiving said difference signals and reducing them to sorting signals, and means controlled by said sorting signals for sorting articles on said conveyor.

14. Apparatus for sorting objects by color comprising conveyor means for presenting substantially the entire surface of the articles to an inspection station, means for illuminating the articles at the inspection station, a pair of photoelectric devices, an optical inspection system comprising means for illuminating opposite sides of articles at said inspection station, primary mirrors on opposite sides of the inspection station, means for directing to said primary mirrors oppositely directed beams of light reflected from opposite sides of articles at said inspection station, a beam joining mirror at the intersection of the beams reflected from said primary mirrors for directing equal portions of the light received from each primary mirror along a common axis, a beam splitting mirror disposed in said axis for directing equal portions of the light received toward each of said photoelectric devices, and filters associated with said photoelectric devices for converting the split beams into light of different wave lengths, said photoelectric devices converting the light at each wave length into a corresponding electric color signal, a comparison circuit for converting the color signals from said photoelectric devices into a series of independent grade signals, a logic circuit for receiving said grade signals and reducing them to sorting signals, and means controlled by said sorting signals for sorting articles on said conveyor.

15. Apparatus for sorting objects by color comprising conveyor means for presenting substantially the entire surface of the articles to an inspection station, means at each side of the articles at the inspection station for illuminating the opposite sides of the articles, means for adjusting the relative intensities of said illuminating means at opposite sides of the articles to render the intensities equal, a pair of photoelectric devices, an optical inspection system comprising means for illuminating opposite sides of articles at said inspection station, primary mirrors on opposite sides of the inspection station, means for directing to said primary mirrors oppositely directed beams of light reflected from opposite sides of articles at said inspection station, a beam joining mirror at the intersection of the beams reflected from said primary mirrors for directing equal portions of the light received from each primary mirror along a common axis, a beam splitting mirror disposed in said axis for directing equal portions of the light received toward each of said photoelectric devices, and filters associated with said photoelectric devices for converting the split beams into light of different wave lengths, said photoelectric devices converting the light at each wave length into a corresponding electric color signal, a comparison circuit for converting the color signals from said photoelectric devices into a series of independent grade signals, a logic circuit for receiving said grade signals and reducing them to sorting signals, and means controlled by said sorting signals for sorting articles on said conveyor.

16. Apparatus for sorting objects by color comprising conveyors means for presenting substantially the entire surface of the articles to an inspection station, means for illuminating the articles at the inspection station, a pair of photoelectric devices, an optical inspection system comprising means for illuminating opposite sides of articles at said inspection station, primary mirrors on opposite sides of the inspection station, means for directing to said primary mirrors oppositely directed beams of light reflected from opposite sides of articles at said inspection station, a beam joining mirror at the intersection of the beams reflected from said primary mirrors for directing equal portions of the light received from each primary mirror along a common axis, a beam splitting mirror disposed in said axis for directing equal portions of the light received toward each of said photoelectric devices, and filters associated with said photoelectric devices for converting the split beams into light of different wave lengths, means for inserting a calibration color test flag into the inspection zone of said optical system, said photoelectric devices converting the light at each wave length into a corresponding electric color signal, a comparison circuit for converting the color signals from said photoelectric devices into a series of independent grade signals, a logic circuit for receiving said grade signals and reducing them to sorting signals, and means controlled by said sorting signals for sorting articles on said conveyor.

17. Apparatus for sorting objects by color comprising conveyor means including flights for presenting the articles to an inspection station, means for illuminating the articles at the inspection station, optical means for converting light reflected from opposite sides of the article into two coaxial oppositely directed beams, a pair of photoelectric devices, optical means for directing equal portions of the light reflected from each side of the articles toward each photoelectric device, filters for converting the light directed toward said photoelectric devices into beams of different wavelengths, said photoelectric devices converting the light at each wavelength into a corresponding electric signal, means for compensating the output of one photoelectric device for the difference between the intensities of light reflected from said flights at said two wavelengths, a comparison circuit including means for providing a plurality of preselected fractions of the signal from one photoelectric device, said comparison circuit separately comparing said plurality of preselected fractions of the signal from said one photoelectric device with the signal from the other photoelectric device to produce a series of independent difference signals, a logic circuit for receiving said difference signals and reducing them to sorting signals, and means controlled by said sorting signals for sorting articles on said conveyor.

18. Apparatus for sorting articles by color comprising a conveyor for the articles to be sorted, an object mirror at each side of said conveyor for receiving reflections from opposite sides of the articles, means for illuminating both sides of articles on the conveyor, means for shielding said illuminating means from directly illuminating said object mirrors during an inspection, the beams from said object mirrors intersecting, a partial mirror at the intersection of the beams for transmitting a portion of the radiant energy from one object mirror and for reflecting an equal portion of the radiant energy from the other object mirror along the line of transmission from said one mirror to form a composite beam, a beam splitting mirror in said line of transmission for splitting the rays into secondary beams of substantially equal radiant energy, a filter in the path of each secondary beam for converting the secondary beams into color beams of different wave lengths, a photoelectric device in the path of each of said color beams for producing color voltage signals, circuit means for combining the signals from said photoelectric means to produce sorting signals, and sorting means responsive to said sorting signals for segregating the articles in accordance with their color.

19. Apparatus for sorting articles by color comprising a conveyor for the articles to be sorted, an object mirror at each side of said conveyor for receiving reflections from opposite sides of the articles, lamps at each side of the articles under inspection for illuminating both sides of articles on the conveyor, means for adjusting the intensities of said lamps at opposite sides of the articles, means for shielding said illuminating means from directly illuminating said object mirrors during an inspection, the beams from said object mirrors intersecting, a partial mirror at the intersection of the beams for transmitting a portion of the radiant energy from one object mirror and for reflecting an equal portion of the radiant energy from the other object mirror along the line of transmission from said one mirror to form a composite beam, a beam splitting mirror in said line of transmission for splitting the rays into secondary beams of substantially equal radiant energy, a filter in the path of each secondary beam for converting the secondary beams into color beams of different wave lengths, a photoelectric device in the path of each of said color beams, circuit means for combining the signals from said photoelectric means to produce sorting signals, and sorting means responsive to said sorting signals for segregating the articles in accordance with their color.

20. Apparatus for sorting articles by color comprising a conveyor for the articles to be sorted, an object mirror at each side of said conveyor for receiving reflections from the articles, means for illuminating both sides of articles on the conveyor, means for shielding said illuminating means from directly illuminating said object mirrors during an inspection, the beams from said object mirrors intersecting, a partial mirror at the intersection of the beams from said object mirrors for transmitting a portion of the radiant energy from one object mirror and for reflecting an equal portion of the radiant energy from the other object mirror along the line of transmission from said one mirror, a light trap for receiving light reflected by said partial mirror from the beam of said one mirror and transmitted by said partial mirror from the beam of said other mirror, a beam splitting mirror in said line of transmission for splitting the rays into secondary beams of substantially equal radiant energy, a photoelectric device in the path of each of said secondary beams, a filter in front of each photoelectric means for transmitting beams of different wavelengths to the photoelectric means, circuit means for combining the signals from said photoelectric means, and sorting means responsive to the combined signals from said photoelectric means.

21. Apparatus for sorting articles by color comprising a conveyor having flights for the articles to be sorted, an object mirror at each side of said conveyor for receiving reflections from opposite sides of the articles, means for illuminating both sides of articles on the conveyor, means for shielding said illuminating means from directly illuminating said object mirrors during an inspection, the beams from said object mirrors intersecting, a partial mirror at the intersection of the beams for transmitting substantially a portion of the radiant energy from one object mirror and for reflecting an equal portion of the radiant energy from the other object mirror along the line of transmission from said one mirror to form a composite beam, a beam splitting mirror in said line of transmission for splitting the rays into secondary beams of substantially equal radiant energy, a filter in the path of each secondary beam for converting the secondary beams into color beams of different wavelengths, a photoelectric device in the path of each of said color beams for producing color voltage signals, means for compensating the output of one photoelectric device for the difference between the intensities of light reflected from said flights at said two wavelengths, circuit means for combining the signals from said photoelectric means to produce sorting signals, and sorting means responsive to said sorting signals for segregating the articles in accordance with their color.

22. Apparatus for sorting objects by color comprising conveyor means for presenting substantially the entire surface of the articles to an inspection station, means for illuminating the articles at the inspection station, a pair of photoelectric devices, an optical inspection system comprising means for illuminating opposite sides of articles at said inspection station, primary mirrors on opposite sides of the inspection station, means for directing to said primary mirrors oppositely directed beams of light reflected from opposite sides of articles at said inspection station, light trap means for interrupting direct transmission of light from said illuminating means to said primary mirrors wherein no article is present at the inspection station, a beam joining mirror at the intersection of the beams reflected from said primary mirrors for directing equal portions of the light received from each primary mirror along a common axis, a beam splitting mirror disposed in said axis for directing equal portions of the total light received toward each of said photoelectric devices, and filters associated with said photoelectric devices for converting the split beams into light beams of different wavelengths, said photoelectric devices converting the light at each wavelength into a corresponding electric color signal, a comparison circuit for converting the color signals from said photoelectric devices into a series of independent grade signals, a logic circuit for receiving said grade signals and reducing them to sorting signals, and means controlled by said sorting signals for sorting articles on said conveyor.

23. Apparatus for sorting objects by color comprising conveyor means for presenting substantially the entire surface of the articles to an inspection station, means for illuminating the articles at the inspection station, a pair of photoelectric devices, an optical inspection system comprising means for illuminating opposite sides of articles at said inspection station, primary mirrors on opposite sides of the inspection station, means for directing to said primary mirrors oppositely directed beams of light reflected from opposite sides of articles at said inspection station, a banded mirror at the intersection of the beams reflected from said primary mirrors, said banded mirror transmitting one half of the light received from one of said primary mirrors and reflecting one half of the light received from the other primary mirror along the axis of said transmitted beam, a beam splitting mirror disposed in said axis for directing substantially one half of the total light received toward each of said photoelectric devices, and filters associated with said photoelectric devices for converting the split beams into light of different wavelengths, said photoelectric devices converting the light at each wavelength into a corresponding electric color signal, a comparison circuit for converting the color signals from said photoelectric devices into a series of independent grade signals, a logic circuit for receiving said grade signals and reducing them to sorting signals, and means controlled by said sorting signals for sorting articles on said conveyor.

24. The method of sorting articles by color which articles have the characteristic that the reflectances of each of various color grades of the article at two selected wave lengths have substantially different ratios, comprising the steps of illuminating a horizontally moving conveyor supported article, forming a composite beam of light made up of equal portions of the light reflected by diametrically opposite sides of the article, dividing said composite beam into sub-beams of substantially equal intensities, filtering said sub-beams into color beams at said selected wave lengths, sensing the intensities of said color beams to provide corresponding electrical color signal voltages, equalizing the two color signal voltages developed upon inspection of an article having a predetermined color, comparing the color signal voltages developed at one of said wave lengths by articles having colors different from said predetermined color with several preselected fractions of the color signal voltages developed at the other of said wave lengths by the same articles, and using the results of said signal comparisons to produce sorting signals for segregating articles having different colors.

25. The sorting method of claim 24, wherein variegated articles are sorted by their total color effect, wherein said step of illuminating the article is carried out by independently illuminating diametrically opposite sides of the article, and further characterized by the step of adjusting the relative illumination of the opposite sides of the article until the intensity of said composite beam of light formed from light reflected from the opposite sides of the article remains constant, regardless of the orientation of the variegated article under inspection.

26. Apparatus for sorting articles by color comprising an endless conveyor trained about pulleys to provide a horizontal upper reach, flight members pivotally mounted on said conveyor and formed with shallow pockets at their trailing edges, the leading edges of said flight members cooperating with the shallow pockets of adjacent flight members to form article confining walls as the flight members pass up and over the front pulley of the conveyor, means for independently illuminating opposite sides of articles in said pockets when the flight members are level on the upper reach of said conveyor, means for converging light beams reflected from opposite sides of the articles, a banded mirror for combining said converging beams into a single composite beam, means for adjusting the relative intensity of illumination applied to the opposite sides of the articles until said composite beam provides equal emphasis on the color response of each side of the article, two photoelectric devices, optical means for directing portions of said composite beam toward each photoelectric device, filters for converting said composite beam portions into beams of different wave lengths, said photoelectric devices converting the light at each wave length into a corresponding electric signal, means for adjusting the relative strength of said signals during inspection of an article of a given color, circuit means for separately comparing a plurality of preselected fractions of the signal from one photoelectric device with the signal from the other photoelectric device to produce a series of independent difference signals and reducing them to article sorting signals, a plurality of tracks along said conveyor each track representing a different grade of article, gate means for causing said rider means to enter a selected track, and actuating means for said gate means controlled by said sorting signals.

27. Apparatus for sorting articles by color comprising a conveyor horizontally moving, flight members mounted on said conveyor and formed with pockets, means for independently and exclusively illuminating diametrically opposite sides of articles while in said pockets for converging light reflected from opposite sides of the articles, a banded mirror for combining said converging beams into a single composite beam, means for independently adjusting the relative intensity of illumination applied to the opposite sides of the articles until said composite beam provides equal emphasis on the color response of each side of the article, two photoelectric devices, optical means for directing portions of said composite beam toward each photoelectric device, filters for converting said composite beam portions into beams of different wave lengths, said photoelectric devices converting the light at each wave length into a corresponding electric signal, means for adjusting the relative strength of said signals during inspection of an article of a given color, circuit means for separately comparing a plurality of preselected fractions of the signal from one photoelectric device with the signal from the other photoelectric device to produce a series of independent difference signals and reducing them to article sorting signals, and article segregating means controlled by said sorting signals.

28. Apparatus for sorting objects by color comprising conveyor means for presenting substantially the entire surface of the articles to an inspection station, means for illuminating the articles at the inspection station, a pair of photoelectric devices, an optical inspection system comprising opposed means for illuminating opposite sides of articles at said inspection station, primary mirrors on opposite sides of the inspection station, means for directing to said primary mirrors oppositely directed beams of light reflected from opposite sides of articles at said inspection station, a banded beam joining mirror at the intersection of the beams reflected from said primary mirrors for forming a composite beam containing portions of the light received from each primary mirror, means for adjusting the relative intensities of said opposed illuminating means so that said composite beam portions are equal, a beam splitting mirror disposed in said axis for directing substantially equal portions of the total light received toward each of said photoelectric devices, and filters associated with said photoelectric devices for converting the split beams into light beams of different wave lengths, said photoelectric devices converting the light at each wave length into a corresponding electric color signal, means for adjusting the output signals derived from said photoelectric devices so that they have a predetermined ratio when an article of a given color is under inspection, a comparison circuit for converting the color signals from said photoelectric devices into a series of independent grade signals, a logic circuit for receiving said grade signals and reducing them to sorting signals, and means controlled by said sorting signals for sorting articles on said conveyor.

29. Apparatus for sorting articles by color comprising an endless conveyor, said conveyor comprising rotatable pulleys at each end of said conveyor, laterally spaced flexible endless members trained about said pulleys and having horizontal upper reaches, means for driving one of said pulleys, flight members releasably mounted between said flexible members, a shallow article receiving pocket formed on each flight member, the leading portion of each flight member extending forwardly of its mounting with the leading edge of each flight member being disposed relatively close to the trailing edge of the adjacent flight member, said leading edges of the flight members forming article confining walls that cooperate with the article receiving pockets of the adjacent flight members as said flight members pass upwardly and over one of said pulleys, means for supplying articles between the leading and trailing edges of said flight members in a horizontal position as they are carried along the upper reach of said flexible members, and means for optically inspecting articles resting in said shallow pockets of the flight members.

References Cited by the Examiner

UNITED STATES PATENTS

| | | | |
|---|---|---|---|
| 2,382,439 | 8/45 | Osborn. | |
| 2,879,407 | 3/59 | Cox | 209—111.5 |
| 2,966,264 | 12/60 | Cox | 209—111.5 |
| 2,988,219 | 6/61 | Bartlett | 209—111.5 |
| 3,012,666 | 12/61 | Cox | 209—111.5 |

ROBERT B. REEVES, *Acting Primary Examiner.*

FRANK L. ABBOTT, ERNEST A. FALLER, Jr.,
*Examiners.*